United States Patent
Fix et al.

(10) Patent No.: US 9,094,929 B2
(45) Date of Patent: Jul. 28, 2015

(54) EVENT TAGGING FOR MOBILE NETWORKS

(75) Inventors: Jeremy Fix, Acworth, GA (US); Francisco Martinez, Cumming, GA (US); Sheldon Kent Meredith, Marietta, GA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 406 days.

(21) Appl. No.: 13/494,959

(22) Filed: Jun. 12, 2012

(65) Prior Publication Data
US 2013/0331131 A1  Dec. 12, 2013

(51) Int. Cl.
*H04W 24/00* (2009.01)
*H04W 64/00* (2009.01)
*G01S 5/02* (2010.01)

(52) U.S. Cl.
CPC ............. *H04W 64/00* (2013.01); *G01S 5/0205* (2013.01); *G01S 5/0284* (2013.01)

(58) Field of Classification Search
CPC ....... H04W 64/00; H04W 4/02; H04W 4/021; H04W 4/028; G01S 5/0205; G01S 5/0284
USPC .......... 455/403, 404.1, 404.2, 422.1, 455/456.1–457
See application file for complete search history.

(56) References Cited

U.S. PATENT DOCUMENTS

| | | | |
|---|---|---|---|
| 4,718,081 A | 1/1988 | Brenig | |
| 5,515,062 A | 5/1996 | Maine et al. | |
| 5,724,660 A | 3/1998 | Kauser et al. | |
| 5,732,354 A | 3/1998 | MacDonald | |
| 5,732,383 A | 3/1998 | Foladare et al. | |
| 5,844,521 A | 12/1998 | Stephens et al. | |

(Continued)

FOREIGN PATENT DOCUMENTS

| | | |
|---|---|---|
| EP | 0856746 A2 | 8/1998 |
| EP | 1145526 | 10/2001 |

(Continued)

OTHER PUBLICATIONS

Smith, et al., "Airsage Overview", Dec. 2011, 39 pages. http://mikeontraffic.typepad.com/files/raleigh-winter-2011-presentation-v11-final.pdf.

(Continued)

*Primary Examiner* — Ajit Patel
(74) *Attorney, Agent, or Firm* — Amin, Turocy & Watson, LLP

(57) ABSTRACT

Providing for improved network event tagging for mobile communications is described herein. By way of example, a mobile network can be configured to take periodic geographic positions of a mobile terminal operating within the mobile network. Network events occurring between the periodic geographic positions, otherwise partially unknown in position, can be estimated by referencing topographical information and estimating a route of travel of the mobile device. Estimated speed of the mobile device can be utilized to place the mobile device on a road network, cycling route, pedestrian walkway, or the like, and refine the estimated position of the mobile device at the time of the network event. Such estimates can be refined from traffic information or other real-time travel data. An estimated position of the mobile device can be output as an approximation of the network event to facilitate event modeling for the mobile network.

20 Claims, 12 Drawing Sheets

(56) References Cited

U.S. PATENT DOCUMENTS

| | | | |
|---|---|---|---|
| 5,982,324 A | 11/1999 | Watters et al. | |
| 6,018,312 A | 1/2000 | Haworth et al. | |
| 6,026,301 A | 2/2000 | Satarasinghe | |
| 6,108,532 A | 8/2000 | Matsuda et al. | |
| 6,108,556 A | 8/2000 | Ito | |
| 6,125,125 A | 9/2000 | Narasimha et al. | |
| 6,148,219 A | 11/2000 | Engelbrecht et al. | |
| 6,216,002 B1 | 4/2001 | Holmring | |
| 6,230,018 B1 | 5/2001 | Watters et al. | |
| 6,256,577 B1 | 7/2001 | Graunke | |
| 6,263,190 B1 | 7/2001 | Mamori et al. | |
| 6,298,233 B1 | 10/2001 | Souissi et al. | |
| 6,307,503 B1 | 10/2001 | Liu et al. | |
| 6,311,078 B1 | 10/2001 | Hardouin et al. | |
| 6,317,686 B1 | 11/2001 | Ran | |
| 6,321,092 B1* | 11/2001 | Fitch et al. | 455/456.5 |
| 6,330,459 B1 | 12/2001 | Crichton et al. | |
| 6,351,235 B1 | 2/2002 | Stilp | |
| 6,353,778 B1 | 3/2002 | Brown et al. | |
| 6,397,074 B1 | 5/2002 | Pihl et al. | |
| 6,405,047 B1 | 6/2002 | Moon | |
| 6,407,703 B1 | 6/2002 | Minter et al. | |
| 6,429,815 B1 | 8/2002 | Soliman | |
| 6,434,396 B1 | 8/2002 | Rune | |
| 6,449,486 B1 | 9/2002 | Rao | |
| 6,453,168 B1 | 9/2002 | McCrady et al. | |
| 6,493,539 B1 | 12/2002 | Falco et al. | |
| 6,515,623 B2 | 2/2003 | Johnson | |
| 6,522,296 B2 | 2/2003 | Holt | |
| 6,526,335 B1 | 2/2003 | Treyz et al. | |
| 6,552,682 B1 | 4/2003 | Fan | |
| 6,560,532 B2 | 5/2003 | Cayford | |
| 6,560,567 B1 | 5/2003 | Yechuri et al. | |
| 6,594,576 B2 | 7/2003 | Fan et al. | |
| 6,604,083 B1 | 8/2003 | Bailey et al. | |
| 6,668,226 B2 | 12/2003 | Sutanto et al. | |
| 6,690,292 B1 | 2/2004 | Meadows et al. | |
| 6,744,383 B1 | 6/2004 | Alfred et al. | |
| 6,744,740 B2 | 6/2004 | Chen | |
| 6,757,545 B2* | 6/2004 | Nowak et al. | 455/456.2 |
| 6,801,782 B2 | 10/2004 | McCrady et al. | |
| 6,801,855 B1 | 10/2004 | Walters et al. | |
| 6,816,782 B1 | 11/2004 | Walters et al. | |
| 6,850,761 B2 | 2/2005 | Pallonen | |
| 6,892,054 B2 | 5/2005 | Belcher et al. | |
| 6,915,123 B1 | 7/2005 | Daudelin et al. | |
| 6,933,100 B2 | 8/2005 | Igawa et al. | |
| 6,933,860 B1 | 8/2005 | Gehman et al. | |
| 7,058,710 B2 | 6/2006 | McCall et al. | |
| 7,065,349 B2 | 6/2006 | Nath et al. | |
| 7,098,805 B2 | 8/2006 | Meadows et al. | |
| 7,113,793 B2 | 9/2006 | Veerasamy et al. | |
| 7,149,534 B2 | 12/2006 | Bloebaum et al. | |
| 7,181,218 B2 | 2/2007 | Ovesjo et al. | |
| 7,277,049 B2 | 10/2007 | Korneluk et al. | |
| 7,289,039 B2 | 10/2007 | Kato et al. | |
| 7,346,359 B2 | 3/2008 | Damarla et al. | |
| 7,359,719 B1 | 4/2008 | Duffett-Smith et al. | |
| 7,366,492 B1 | 4/2008 | Ganesh | |
| 7,375,649 B2 | 5/2008 | Gueziec | |
| 7,420,464 B2 | 9/2008 | Fitzgerald et al. | |
| 7,432,829 B2 | 10/2008 | Poltorak | |
| 7,436,794 B2 | 10/2008 | Takahashi et al. | |
| 7,463,143 B2 | 12/2008 | Forr et al. | |
| 7,508,321 B2 | 3/2009 | Gueziec | |
| 7,664,492 B1 | 2/2010 | Lee et al. | |
| 7,696,922 B2 | 4/2010 | Nicholson et al. | |
| 7,697,917 B2 | 4/2010 | Camp et al. | |
| 7,706,964 B2 | 4/2010 | Horvitz et al. | |
| 7,744,740 B2 | 6/2010 | Diehl | |
| 7,747,258 B2 | 6/2010 | Farmer et al. | |
| 7,761,225 B2 | 7/2010 | Vaughn | |
| 7,831,380 B2 | 11/2010 | Chapman et al. | |
| 7,848,880 B2 | 12/2010 | Cheung | |
| 7,890,299 B2 | 2/2011 | Fok et al. | |
| 7,917,156 B2 | 3/2011 | Sheynblat et al. | |
| 7,945,271 B1 | 5/2011 | Barnes et al. | |
| 7,958,001 B2 | 6/2011 | Abbadessa et al. | |
| 7,962,162 B2 | 6/2011 | McNair | |
| 7,962,280 B2 | 6/2011 | Kindo et al. | |
| 7,994,981 B1 | 8/2011 | Farrokhi et al. | |
| 7,996,020 B1 | 8/2011 | Chhabra | |
| 8,000,726 B2 | 8/2011 | Altman et al. | |
| 8,005,050 B2 | 8/2011 | Scheinert et al. | |
| 8,010,164 B1 | 8/2011 | Sennett et al. | |
| 8,036,822 B2 | 10/2011 | Ho et al. | |
| 8,054,802 B2 | 11/2011 | Burgess et al. | |
| 8,065,185 B2 | 11/2011 | Foladare et al. | |
| 8,098,152 B2 | 1/2012 | Zhang et al. | |
| 8,121,604 B1 | 2/2012 | Schwinghammer | |
| 8,126,479 B2 | 2/2012 | Morrison | |
| 8,140,079 B2 | 3/2012 | Olson | |
| 8,193,984 B2 | 6/2012 | Ward et al. | |
| 8,194,589 B2 | 6/2012 | Wynn et al. | |
| 8,195,175 B2 | 6/2012 | Govindan et al. | |
| 8,224,349 B2 | 7/2012 | Meredith et al. | |
| 8,253,559 B2 | 8/2012 | Howard et al. | |
| 8,254,959 B2 | 8/2012 | Fix et al. | |
| 8,264,956 B2 | 9/2012 | Ramankutty et al. | |
| 8,270,933 B2 | 9/2012 | Riemer et al. | |
| 8,280,438 B2 | 10/2012 | Barbera et al. | |
| 8,295,854 B2 | 10/2012 | Osann et al. | |
| 8,307,030 B1 | 11/2012 | Hu | |
| 8,326,682 B2 | 12/2012 | Redford et al. | |
| 8,355,865 B2 | 1/2013 | Wagner et al. | |
| 8,417,264 B1 | 4/2013 | Whitney et al. | |
| 8,548,494 B2* | 10/2013 | Agarwal et al. | 455/456.1 |
| 8,572,198 B2 | 10/2013 | Jhanji | |
| 8,594,700 B2* | 11/2013 | Nabbefeld | 455/456.1 |
| 8,611,919 B2 | 12/2013 | Barnes | |
| 8,612,410 B2 | 12/2013 | Meredith et al. | |
| 8,666,388 B2 | 3/2014 | Catovic et al. | |
| 8,666,390 B2 | 3/2014 | Meredith et al. | |
| 8,761,799 B2 | 6/2014 | Meredith et al. | |
| 8,909,247 B2 | 12/2014 | Tipton et al. | |
| 9,008,684 B2 | 4/2015 | Tipton et al. | |
| 9,008,698 B2 | 4/2015 | Meredith et al. | |
| 2001/0047242 A1 | 11/2001 | Ohta | |
| 2002/0059266 A1 | 5/2002 | I'anson et al. | |
| 2002/0069312 A1 | 6/2002 | Jones | |
| 2002/0077116 A1 | 6/2002 | Havinis et al. | |
| 2002/0172223 A1 | 11/2002 | Stilp et al. | |
| 2003/0092448 A1 | 5/2003 | Forstrom et al. | |
| 2003/0095065 A1 | 5/2003 | Ericson et al. | |
| 2003/0097330 A1 | 5/2003 | Hillmer et al. | |
| 2003/0115260 A1 | 6/2003 | Edge | |
| 2003/0125046 A1 | 7/2003 | Riley et al. | |
| 2003/0158924 A1 | 8/2003 | DeLegge | |
| 2003/0222819 A1 | 12/2003 | Karr et al. | |
| 2003/0225508 A9 | 12/2003 | Petzld et al. | |
| 2004/0024639 A1 | 2/2004 | Goldman et al. | |
| 2004/0067759 A1 | 4/2004 | Spirito et al. | |
| 2004/0082338 A1 | 4/2004 | Norrgard et al. | |
| 2004/0127191 A1 | 7/2004 | Matsunaga | |
| 2004/0131036 A1 | 7/2004 | Walsh | |
| 2004/0155814 A1 | 8/2004 | Bascobert | |
| 2004/0172190 A1 | 9/2004 | Tsunehara et al. | |
| 2004/0219930 A1 | 11/2004 | Lin | |
| 2004/0224698 A1 | 11/2004 | Yi et al. | |
| 2004/0267561 A1 | 12/2004 | Meshkin et al. | |
| 2005/0007993 A1 | 1/2005 | Chambers et al. | |
| 2005/0039056 A1 | 2/2005 | Bagga et al. | |
| 2005/0053099 A1 | 3/2005 | Spear et al. | |
| 2005/0136911 A1 | 6/2005 | Csapo et al. | |
| 2005/0239410 A1 | 10/2005 | Rochester | |
| 2005/0272445 A1 | 12/2005 | Zellner et al. | |
| 2005/0276385 A1 | 12/2005 | McCormick et al. | |
| 2006/0030333 A1 | 2/2006 | Ward et al. | |
| 2006/0046744 A1 | 3/2006 | Dublish et al. | |
| 2006/0075131 A1 | 4/2006 | Douglas et al. | |
| 2006/0089153 A1 | 4/2006 | Sheynblat | |
| 2006/0200303 A1 | 9/2006 | Fuentes et al. | |
| 2006/0240839 A1 | 10/2006 | Chen et al. | |
| 2006/0267841 A1 | 11/2006 | Lee et al. | |

(56) References Cited

U.S. PATENT DOCUMENTS

| | | |
|---|---|---|
| 2006/0270419 A1 | 11/2006 | Crowly et al. |
| 2006/0282660 A1 | 12/2006 | Varghese et al. |
| 2007/0001873 A1 | 1/2007 | Ishikawa et al. |
| 2007/0049286 A1 | 3/2007 | Kim et al. |
| 2007/0060130 A1 | 3/2007 | Gogic et al. |
| 2007/0176749 A1 | 8/2007 | Boyd |
| 2007/0213074 A1 | 9/2007 | Fitch et al. |
| 2007/0217375 A1 | 9/2007 | Zampiello et al. |
| 2007/0217379 A1 | 9/2007 | Fujiwara et al. |
| 2007/0293157 A1 | 12/2007 | Haartsen et al. |
| 2007/0298807 A1 | 12/2007 | Yarkosky |
| 2008/0004789 A1 | 1/2008 | Horvitz et al. |
| 2008/0010365 A1 | 1/2008 | Schneider |
| 2008/0039114 A1 | 2/2008 | Phatak et al. |
| 2008/0070593 A1 | 3/2008 | Altman et al. |
| 2008/0071466 A1 | 3/2008 | Downs et al. |
| 2008/0076450 A1 | 3/2008 | Nanda et al. |
| 2008/0096566 A1 | 4/2008 | Brunner et al. |
| 2008/0133730 A1 | 6/2008 | Park et al. |
| 2008/0186234 A1 | 8/2008 | Alles et al. |
| 2008/0192682 A1 | 8/2008 | Matsumoto et al. |
| 2008/0274750 A1 | 11/2008 | Carlson et al. |
| 2008/0299995 A1 | 12/2008 | Spain |
| 2008/0305832 A1 | 12/2008 | Greenberg |
| 2008/0311923 A1 | 12/2008 | Petrovic et al. |
| 2009/0017823 A1 | 1/2009 | Sachs et al. |
| 2009/0024546 A1 | 1/2009 | Ficcaglia et al. |
| 2009/0052330 A1 | 2/2009 | Matsunaga et al. |
| 2009/0079622 A1 | 3/2009 | Seshadri et al. |
| 2009/0104917 A1 | 4/2009 | Ben Rached et al. |
| 2009/0117907 A1 | 5/2009 | Wigren et al. |
| 2009/0125380 A1 | 5/2009 | Otto et al. |
| 2009/0131073 A1 | 5/2009 | Carlson et al. |
| 2009/0181695 A1 | 7/2009 | Wirola et al. |
| 2009/0260055 A1 | 10/2009 | Parmar |
| 2009/0280828 A1 | 11/2009 | Wang et al. |
| 2009/0286510 A1 | 11/2009 | Huber et al. |
| 2009/0287922 A1 | 11/2009 | Herwono et al. |
| 2009/0299788 A1 | 12/2009 | Huber et al. |
| 2009/0310501 A1 | 12/2009 | Catovic et al. |
| 2009/0312005 A1* | 12/2009 | Mukundan et al. ......... 455/422.1 |
| 2009/0327134 A1 | 12/2009 | Carlson et al. |
| 2010/0004997 A1 | 1/2010 | Mehta et al. |
| 2010/0020776 A1 | 1/2010 | Youssef et al. |
| 2010/0054237 A1 | 3/2010 | Han et al. |
| 2010/0056179 A1* | 3/2010 | Gaenger et al. ............ 455/456.1 |
| 2010/0058442 A1 | 3/2010 | Costa et al. |
| 2010/0081389 A1 | 4/2010 | Lawrow |
| 2010/0094758 A1 | 4/2010 | Chamberlain et al. |
| 2010/0100732 A1 | 4/2010 | Hatakeyama et al. |
| 2010/0113035 A1 | 5/2010 | Eskicioglu et al. |
| 2010/0120447 A1 | 5/2010 | Anderson et al. |
| 2010/0124931 A1 | 5/2010 | Eskicioglu et al. |
| 2010/0135178 A1 | 6/2010 | Aggarwal et al. |
| 2010/0144368 A1 | 6/2010 | Sullivan |
| 2010/0159951 A1 | 6/2010 | Shkedi et al. |
| 2010/0172259 A1 | 7/2010 | Aggarwal et al. |
| 2010/0189236 A1 | 7/2010 | MacDonald et al. |
| 2010/0190509 A1 | 7/2010 | Davis et al. |
| 2010/0195566 A1 | 8/2010 | Krishnamurthy et al. |
| 2010/0203903 A1 | 8/2010 | Dingler et al. |
| 2010/0207470 A1 | 8/2010 | Kim et al. |
| 2010/0220665 A1 | 9/2010 | Govindan et al. |
| 2010/0222075 A1 | 9/2010 | Miura |
| 2010/0227589 A1 | 9/2010 | Cook et al. |
| 2010/0250542 A1 | 9/2010 | Fujimaki |
| 2010/0262449 A1 | 10/2010 | Monteforte et al. |
| 2010/0273504 A1 | 10/2010 | Bull et al. |
| 2010/0291907 A1 | 11/2010 | MacNaughtan et al. |
| 2010/0299060 A1 | 11/2010 | Snavely et al. |
| 2010/0311437 A1 | 12/2010 | Palanki et al. |
| 2010/0313157 A1 | 12/2010 | Carlsson et al. |
| 2010/0323723 A1 | 12/2010 | Gerstenberger et al. |
| 2010/0331013 A1 | 12/2010 | Zhang |
| 2011/0009068 A1 | 1/2011 | Miura |
| 2011/0010085 A1 | 1/2011 | Tanaka et al. |
| 2011/0023129 A1 | 1/2011 | Vernal |
| 2011/0053609 A1 | 3/2011 | Choi-Grogan |
| 2011/0060808 A1 | 3/2011 | Martin et al. |
| 2011/0065450 A1 | 3/2011 | Kazmi |
| 2011/0072034 A1 | 3/2011 | Sly |
| 2011/0076975 A1 | 3/2011 | Kim et al. |
| 2011/0077032 A1 | 3/2011 | Correale et al. |
| 2011/0099047 A1 | 4/2011 | Weiss et al. |
| 2011/0106416 A1 | 5/2011 | Scofield et al. |
| 2011/0161261 A1 | 6/2011 | Wu et al. |
| 2011/0164596 A1 | 7/2011 | Montemurro et al. |
| 2011/0171912 A1 | 7/2011 | Beck et al. |
| 2011/0172905 A1 | 7/2011 | Schroder et al. |
| 2011/0205964 A1 | 8/2011 | Fix et al. |
| 2011/0207470 A1 | 8/2011 | Meredith et al. |
| 2011/0210843 A1 | 9/2011 | Kummetz et al. |
| 2011/0210849 A1 | 9/2011 | Howard et al. |
| 2011/0244879 A1 | 10/2011 | Siomina et al. |
| 2011/0256874 A1 | 10/2011 | Hayama et al. |
| 2011/0271331 A1 | 11/2011 | Adams |
| 2011/0296169 A1 | 12/2011 | Palmer |
| 2011/0319098 A1 | 12/2011 | Potorny et al. |
| 2012/0016902 A1 | 1/2012 | Ranjan et al. |
| 2012/0025976 A1 | 2/2012 | Richey et al. |
| 2012/0028650 A1 | 2/2012 | Cooper et al. |
| 2012/0030083 A1 | 2/2012 | Newman et al. |
| 2012/0032855 A1 | 2/2012 | Reede et al. |
| 2012/0052883 A1 | 3/2012 | Austin et al. |
| 2012/0052884 A1 | 3/2012 | Bogatin |
| 2012/0062415 A1 | 3/2012 | Hwang et al. |
| 2012/0087338 A1 | 4/2012 | Brandt et al. |
| 2012/0139782 A1 | 6/2012 | Gutt et al. |
| 2012/0158289 A1 | 6/2012 | Bernheim Brush et al. |
| 2012/0182180 A1 | 7/2012 | Wolf et al. |
| 2012/0182874 A1 | 7/2012 | Siomina et al. |
| 2012/0185309 A1 | 7/2012 | Kakarla et al. |
| 2012/0214509 A1 | 8/2012 | Levin et al. |
| 2012/0287911 A1 | 11/2012 | Takano et al. |
| 2012/0302254 A1 | 11/2012 | Charbit et al. |
| 2012/0317500 A1 | 12/2012 | Kosseifi et al. |
| 2012/0323703 A1 | 12/2012 | Hillier et al. |
| 2012/0327869 A1 | 12/2012 | Wang et al. |
| 2013/0007058 A1 | 1/2013 | Meredith et al. |
| 2013/0023237 A1 | 1/2013 | Meredith et al. |
| 2013/0023274 A1 | 1/2013 | Meredith et al. |
| 2013/0023281 A1 | 1/2013 | Meredith et al. |
| 2013/0053057 A1 | 2/2013 | Cansino et al. |
| 2013/0096966 A1 | 4/2013 | Barnes |
| 2013/0137464 A1 | 5/2013 | Kramer et al. |
| 2013/0281111 A1 | 10/2013 | Syrjarinne et al. |
| 2013/0324149 A1 | 12/2013 | Fix et al. |
| 2014/0062782 A1 | 3/2014 | Abraham |
| 2014/0122220 A1 | 5/2014 | Bradley et al. |
| 2014/0171060 A1 | 6/2014 | Cook et al. |
| 2014/0278744 A1 | 9/2014 | Lo Faro et al. |

FOREIGN PATENT DOCUMENTS

| | | |
|---|---|---|
| JP | 2004069609 A | 3/2004 |
| JP | 2005091303 A | 4/2005 |
| JP | 2007328050 A | 12/2007 |
| WO | WO2006031035 A1 | 3/2006 |

OTHER PUBLICATIONS

3rd Generation Partnership Project, Technical Specification, "Group GSM/EDGE Radio Access Network, Radio subsystem synchronization (Release 8)", 3GPP TS 45.010 V8.0.0 (May 2008), last viewed Jul. 1, 2009, 30 pages.

3rd Generation Partnership Project, Technical Specification, "Group Radio Access Network, UTRAN Iuh interface Node B Application Part (NBAP) signalling (Release 8)", 3GPP TS 25.469 V8.0.0 (Dec. 2008), last viewed Jul. 1, 2009, 56 pages.

Sullivan, Mark. "Signs and Wonders: Is At&T Stepping Up Its Game?" PC World, Dec. 10, 2009, 1 page.

(56) References Cited

OTHER PUBLICATIONS

ETSI TS 125 215 V6.4.0 (Sep. 2005). Universal Mobile Telecommunications System (UMTS), Physical layer, Measurements (FDD), 3GPP TS 25.215 version 6.4.0 Release 6). Last accessed Jun. 18, 2010, 20 pages.
ETSI TS 125 331 V6.9.0 (Mar. 2006). Universal Mobile Telecommunications System (UMTS), Radio Resource Control (RRC) protocol specification, (3GPP TS 25.331 version 6.9.0 Release 6). Last accessed Jun. 18, 2010, 1211 pages.
New Devices Aim to Disable Cell Phones While Driving. FOXNews.com, Jan. 18, 2009. http://www.foxnews.com/printer_friendly_story/0,3566,480585,00.html. Last accessed Nov. 24, 2010, 2 pages.
Cortes, et al. "Support-Vector Networks", Machine Learning, 20, 1995. http://www.springerlink.com/content/k238jx04hm87j80g/fulltext.pdf. Last accessed Dec. 24, 2010, 25 pages.
ACM Website, Press release of Mar. 17, 2009. http://www.acm.org/press-room/news-releases/pdfs/awards-08-groupa1.pdf. Last accessed Dec. 24, 2010, 3 pages.
Boser, et al. A training algorithm for optimal margin classifiers. In D. Haussler, editor, 5th Annual ACM Workshop on COLT, pp. 144-152, Pittsburgh, PA, 1992. ACM Press.http://citeseerx.ist.psu.edu/viewdoc/summary?doi=10.1.1.21.3818. Last accessed Dec. 24, 2010, 9 pages.
Hsu, et al. A Practical Guide to Support Vector Classification. Department of Computer Science National Taiwan University, Last updated: Apr. 15, 2010.http://www.csie.ntu.edu.tw/~cjlin/papers/guide/guide.pdf. Last accessed Dec. 24, 2010, 16 pages.
Drucker, et al. Support Vector Regression Machines.http://scholar.google.com/scholar?q=%22Support+Vector+Regression+Machines.%22. Last accessed Dec. 24, 2010, 7 pages.
Suykens et al., "Least squares support vector machine classifiers", Neural Processing Letters, vol. 9, No. 3, Jun. 1999, pp. 293-300.
Ferris et al. (2002). "Interior-point methods for massive support vector machines". SIAM Journal on Optimization 13: 783-804. doi:10.1137/S1052623400374379.
Meyer et al. "The support vector machine under test." Neurocomputing 55(1-2): 169-186, 2003.
Charitanetra et al. "Mobile positioning location using E-OTD method for GSM network" Research and Development, 2003. Proceedings Student Conference on Putrajaya, Malaysia Aug. 25-26, 2003, pp. 319-324.
"Location Labs Powers Location-based Fraud Detection", All Points Blog, http://webcache.googleusercontent.com/search?hl=en&rlz=1R2GFRE_en US398&q=cache:trsMn9Sin6wJ:http://apb.directionsmag.com/entry/location-labs-powers-location-based-fraud-detection/162802+http%3A//apb.directionsmag.com/entry/location-labs-powers-location-based-...1&ct=clnk, Oct. 12, 2010.
"Location Based Fraud Detection", Finsphere Corporation, 2008-2010.
Fleishman. Using the Personal Hotspot on your AT & T iPhone. Published online Mar. 15, 2011. http://www.macworld.com/article/158556/2011/03/personal_hotspot_att . . . , 4 pages.
Fleischfresser. Never Stop at a Red-Light Again. Published online Aug. 30, 2011. http://www.smartplanet.com/blog/ . . . , 2 pages.
Cellphone Networks and the Future of Traffic. Published online Mar. 2, 2011. http://m.wired.com/autopia/2011/03/cell-phone-networks-and-the-future- . . . 15 pages.
Ban Xuegang(Jeff), Gruteser Marco. Mobile Sensor as Traffic Probes: Addressing Transportation Modeling and Privacy Protection in an Integrated Framework. Dated Jan. 10, 2010. 17 pages.
Office Action dated Dec. 28, 2011 for U.S. Appl. No. 12/836,471, 34 pages.
Office Action dated Feb. 23, 2012 for U.S. Appl. No. 12/967,747, 31 pages.
Office Action dated Dec. 15, 2011 for U.S. Appl. No. 12/712,424, 34 pages.
Office Action dated Apr. 13, 2012 for U.S. Appl. No. 12/416,853, 36 pages.
OA dated Dec. 2, 2012 for U.S. Appl. No. 13/554,285, 19 pages.
OA dated Aug. 30, 2012 for U.S. Appl. No. 12/958,146, 40 pages.
MobileLutions Introduces MobiLoc—A Breakthrough Technology to Control Texting in the Mobile Workplace. Press release Oct. 10, 2010 by MobileLutions. 2 pages.
DriveAssist Frequently Ask question by Aegis Mobility, Wayback archive Jul. 12, 2010, 2 pages.
OA dated Jul. 30, 2012 for U.S. Appl. No. 12/967,747, 28 pages.
OA dated Jul. 17, 2012 for U.S. Appl. No. 13/220,083, 57 pages.
OA dated Sep. 11, 2012 for U.S. Appl. No. 13/188,345, 44 pages.
OA dated Oct. 15, 2012 for U.S. Appl. No. 13/523,778, 21 pages.
OA dated Dec. 20, 2012 for U.S. Appl. No. 12/958,146, 23 pages.
OA dated Dec. 28, 2012 for U.S. Appl. No. 13/188,295, 37 pages.
OA dated Jan. 3, 2013 for U.S. Appl. No. 13/188,300, 36 pages.
OA dated Nov. 8, 2012 for U.S. Appl. No. 13/204,535, 30 pages.
Final Office Action dated Jan. 25, 2013, for U.S. Appl. No. 13/554,285, 20 pgs.
Non-Final Office Action dated Mar. 19, 2013, for U.S. Appl. No. 13/174,541, 46 pgs.
Final Office Action dated Feb. 13, 2013, for U.S. Appl. No. 13/220,083, 48 pgs.
Final Office Action dated Feb. 22, 2013, for U.S. Appl. No. 13/188,345, 45 pgs.
Final Office Action dated Mar. 15, 2013, for U.S. Appl. No. 13/204,535, 18 pgs.
Non-Final Office Action dated Mar. 19, 2013, for U.S. Appl. No. 13/284,497, 46 pgs.
Non-Final Office Action dated Apr. 19, 2013, for U.S. Appl. No. 13/277,595, 58 pages.
Office Action dated Apr. 8, 2014 for U.S. Appl. No. 13/175,199, 52 Pages.
Office Action dated Apr. 23, 2014 for U.S. Appl. No. 13/291,917, 29 Pages.
Office Action dated Apr. 22, 2014 for U.S. Appl. No. 13/447,069, 51 Pages.
Office Action dated Sep. 20, 2012 for U.S. Appl. No. 12/870,254, 29 pages.
Office Action dated May 14, 2014 for U.S. Appl. No. 13/660,689, 62pages.
Office Action dated May 9, 2014 for U.S. Appl. No. 13/188,136, 33 pages.
Squires, "Practical Physics", Cambridge University Press, p. 12, 1986, 3 pages.
Represent (2000). In Collins English dictionary. Retrieved from http://search.credoreference.com/content/entry/hcengdict/represent/0, 2 pages.
Represent. (2001). In Chambers 21st century dictionary. Retrieved from http://search.credoreference.com/content/entry/chambdict/represent/O.
Represent. (2011). In the american heritage dictionary of the english language. Retrieved from http://search.credoreference.com/content/entry/hmdictenglang/represent/0.
Non-Final Office Action dated May 20, 2014 for U.S. Appl. No. 13/551,369, 29 pages.
Non-Final Office Action dated May 30, 2014 for U.S. Appl. No. 13/277,595, 49 pages.
Non-Final Office Action dated Jun. 3, 2014 for U.S. Appl. No. 13/523,770, 53 pages.
Non-Final Office Action dated Jun. 6, 2014 for U.S. Appl. No. 13/447,072, 25 pages.
Office Action dated Jun. 18, 2014 for U.S. Appl. No. 13/305,276, 26 Pages.
Office Action dated Jun. 26, 2014 for U.S. Appl. No. 13/557,425, 24 Pages.
Notice of Allowance mailed Aug. 12, 2013, for U.S. Appl. No. 13/174,541, 40 pages.
Final Office Action dated Aug. 2, 2013, for U.S. Appl. No. 13/188,295, 26 pages.
Final Office Action dated Aug. 2, 2013, for U.S. Appl. No. 13/188,300, 38 pages.
Non-Final Office Action dated Jun. 20, 2013, for U.S. Appl. No. 13/219,911, 61 pages.
Non-Final Office Action dated Jul. 17, 2013, for U.S. Appl. No. 13/188,345, 27 pages.

(56) References Cited

OTHER PUBLICATIONS

Non-Final Office Action dated Jun. 20, 2013, for U.S. Appl. No. 13/291,917, 52 pages.
Non-Final Office Action dated May 31, 2013, for U.S. Appl. No. 13/523,770, 40 pages.
Non-Final Office Action dated Sep. 19, 2013, for U.S. Appl. No. 13/927,020, 30 pages.
Non-Final Office Action dated Oct. 2, 2013 for U.S. Appl. No. 12/958,146, 31 pages.
Non-Final Office Action dated Sep. 26, 2013 for U.S. Appl. No. 13/284,456, 58 pages.
RouteFinder 3.00 for ArGIS Documentation, © 2007 Routeware and Higher Mapping Solutions, 71 pages, downloaded from http://www.routeware.dk/download/routefinder_arcgis.pdf.
mySociety (Web page), "More travel-time maps and their uses", 2007, downloaded from http://www.mySociety.org/2007/more-travel-maps/, 10 pages total (including a single page Examiner's attachment showing the operation of the interactive travel-time map).
Wayback machine archive from Jan. 21, 2009 of the mySociety Web page, "More travel-time maps and their uses", downloaded from http://web.archive.org/web/20090121193615/http://www.mysociety.org/2007/more-travel-maps/, 11 pages.
Street, Nicholas, "TimeContours: Using isochrone visualisation to describe transport network travel cost", Final Report, Jun. 14, 2006, Department of Computing Imperial College London, 97 pages. Downloaded from http://www.doc.ic.ac.uk/teaching/projects/Distinguished06/nicholasstreet.pdf.
Non-Final Office Action dated Nov. 5, 2013 for U.S. Appl. No. 13/188,136, 47 pages.
Final Office Action dated Sep. 18, 2013, for U.S. Appl. No. 13/284,497, 30 pages.
Final Office Action dated Aug. 22, 2013, for U.S. Appl. No. 13/277,595, 36 pages.
Final Office Action dated Oct. 21, 2013, for U.S. Appl. No. 13/523,770, 24 pages.
Office Action dated Nov. 5, 2013 for U.S. Appl. No. 13/188,345, 30 pages.
Non-Final Office Action dated Dec. 11, 2013, for U.S. Appl. No. 13/188,295, 52 pages.
Non-Final Office Action dated Dec. 24, 2013, for U.S. Appl. No. 13/188,300, 44 pages.
Final Office Action dated Dec. 11, 2013, for U.S. Appl. No. 13/291,917, 34 pages.
Final Office Action dated Jan. 15, 2014 for U.S. Appl. No. 13/219,911, 38 pages.
Final Office Action dated Jan. 28, 2014, for U.S. Appl. No. 12/958,146, 24 pages.
Notice of Allowance dated Feb. 14, 2014 for U.S. Appl. No. 13/284,456, 30 pages.
Final Office Action dated Feb. 24, 2014, for U.S. Appl. No. 13/927,020, 18 pages.
Office Action dated Dec. 30, 2013 for U.S. Appl. No. 13/305,267, 10 pages.
Office Action dated Feb. 5, 2014 for U.S. Appl. No. 13/526,988, 56 pages.
"Locate your friends in real time with Google Latitude." http://googlemobile.blogspot.com/2009/02/locate-your-friends-in-real-time-with.html. Last accessed Mar. 8, 2012, 23 pages.
"Location sharing and updating." http://support.google.com/mobile/bin/answer.py?hl=en&answer=136647. Last accessed Mar. 8, 2012, 3 pages.
"Privacy Settings." http://support.google.com/mobile/bin/answer.py?hl=en&answer=136650, Last accessed Mar. 8, 2012, 1 page.
Office Action dated Nov. 25, 2013 for U.S. Appl. No. 13/447,069, 40 pages.
Office Action dated May 9, 2013 for U.S. Appl. No. 13/447,069, 33 pages.
Tsai, et al, "Location-Sharing Technologies: Privacy Risks and Controls." Feb. 2010. Retrieved on May 10, 2013, 26 pages.
Li et al, "Sharing Location in Online Social Networks". IEEE Network, Sep./Oct. 2010; 0890-8044/10/$25.00 (c)2010 IEEE. Retrieved on May 10, 2013, 6 pages.
Tsai, et al, "Who's Viewed You? The Impact of Feedback in a Mobile Location-Sharing Application". CHI 2009—Security and Privacy, Apr. 9, 2009—Boston, MA, USA. Retrieved on May 10, 2013, 10 pages.
Pettersen, et al., "Automatic antenna tilt control for capacity enhancement in UMTS FDD." Retrieved on Mar. 25, 2012, 5 pages.
Islam, et al., "Self-Optimization of Antenna Tilt and Pilot Power for Dedicated Channels." Retrieved on Mar. 25, 2012, 8 pages.
Bigham, et al., "Tilting and Beam-shaping for Traffic Load Balancing in WCDMA Network." Retrieved on Mar. 25, 2012, 4 pages.
3GPP TS 25.331 V6.9.0 (Mar. 2006) RRC protocol for the UE-UTRAN radio interface.
3GPP TS 25.413 V6.9.0 (Mar. 2006) UTRAN lu interface RANAP signalling.
Marko Silventoinen, Timo Rantalainen, "Mobile Station Locating in GSM" Helsinki, Finland, Last accessed on Nov. 15, 2011, 7 pages.
Office Action dated May 21, 2013 for U.S. Appl. No. 13/305,276, 28 pages.
Office Action dated Oct. 24, 2012 for U.S. Appl. No. 13/305,276, 37 pages.
Office Action dated Mar. 25, 2014 for U.S. Appl. No. 13/488,144, 60 Pages.
Interview Summary dated Feb. 3, 2014 for U.S. Appl. No. 13/188,136, 10 pages.
Rabinowitz, et al., A new positioning system using television synchronization signals, IEEE Transactions on Broadcasting, vol. 51(1), p. 51-61, Mar. 2005.
Final Office Action dated Apr. 3, 2014 for U.S. Appl. No. 13/188,295, 37 pages.
Office Action dated Jun. 30, 2014 for U.S. Appl. No. 13/305,267, 44 Pages.
Office Action dated Jul. 22, 2014 for U.S. Appl. No. 12/958,146, 38 Pages.
Notice of Allowance dated Jul. 22, 2014 for U.S. Appl. No. 13/525,065, 82 Pages.
Notice of Allowance dated Jul. 7, 2014 for U.S. Appl. No. 13/188,295, 51 pages.
Notice of Allowance dated Jul. 22, 2014 for U.S. Appl. No. 13/188,300, 49 Pages.
Office Action dated Jul. 8, 2014 for U.S. Appl. No. 13/284,497, 48 pages.
Office Action dated Aug. 11, 2014 for U.S. Appl. No. 14/279,176, 22 pages.
Girardin, et al., "Digital footprinting: Uncovering tourists with user generated content." Pervasive Computing, IEEE 7.4, Oct.-Nov. 2008. 8 pages.
Steinfield, "The development of location based services in mobile commerce." ELife after the Dot Com Bust. PhysicaVerlagHD, 2004. 15 pages.
Sevtsuk, et al., "Does urban mobility have a daily routine? Learning from the aggregate data of mobile networks." Journal of Urban Technology, vol. 17, No. 1, Apr. 2010: 20 pages.
Buhalis, et al., "Information communication technology revolutionizing tourism." Tourism Recreation Research, vol. 30, No. 3, 2005. 10 pages.
Ratti, et al. "Mobile Landscapes: using location data from cell phones for urban analysis." Environment and Planning B: Planning and Design, vol. 33, 2006, 23 pages.
Office Action dated Feb. 13, 2015 for U.S. Appl. No. 13/188,136, 44 pages.
Notice of Allowance mailed Feb. 6, 2015 for U.S. Appl. No. 13/204,535, 20 pages.
Office Action dated Feb. 13, 2015 for U.S. Appl. No. 14/516,286, 62 pages.
Notice of Allowance dated Aug. 21, 2014 for U.S. Appl. No. 13/447,069, 78 pages.
Office Action dated Aug. 28, 2014 for U.S. Appl. No. 13/526,988, 83 pages.
Office Action dated Sep. 22, 2014 for U.S. Appl. No. 13/175,199, 62 pages.

(56) References Cited

OTHER PUBLICATIONS

Office Action dated Oct. 17, 2014 for U.S. Appl. No. 13/204,535, 47 pages.
Office Action dated Oct. 22, 2014 for U.S. Appl. No. 13/557,425, 59 pages.
Office Action dated Nov. 14, 2014 for U.S. Appl. No. 13/277,595, 74 pages.
Notice of Allowance dated Nov. 20, 2014 for U.S. Appl. No. 13/866,909, 27 pages.
Notice of Allowance dated Dec. 9, 2014 for U.S. Appl. No. 12/958,146, 48 pages.
Office Action dated Dec. 11, 2014 for U.S. Appl. No. 13/447,072, 28 pages.
Office Action dated Dec. 1, 2014 for U.S. Appl. No. 13/495,756, 76 pages.
Office Action dated Jan. 7, 2015 for U.S. Appl. No. 13/557,425, 30 pages.
Notice of Allowance dated Jan. 21, 2015 for U.S. Appl. No. 13/495,391, 98 pages.
Calabrese, et al., "Real-Time Urban Monitoring Using Cell Phones: A Case Study in Rome," IEEE Transactions on Intelligent Transportation Systems, 2010, 11 pages, IEEE.
International Search Report and Written Opinion for PCT Application No. US2011/026122 dated Jun. 10, 2011, 11 pages.
International Search Report and Written Opinion for PCT Application No. US2011/026120 dated Jun. 9, 2011, 13 pages.
Intelligent Transportation System. Published online http://en.wikipedia.org/wiki/Intelligent_transportation_system. Retrieved on Aug. 15, 2011, 7 pages.
Koukoumidis, et al., SignalGuru: Leveraging Mobile Phones for Collaborative Traffic Signal Schedule Advisory, 2011, 14 pages, ACM, Bethesda, Maryland, USA.
Bitcarrier Technology. Published online at http://www.bitcarrier.com/technology. Retrieved on Aug. 15, 2011, 1 page.
Hao, et al., "Estimating Vehicle Position in A Queue at Signalized Intersections Using Sample Travel Times from Mobile Sensors," 6 pages, Retrieved on Nov. 19, 2011.
"Universal Mobile Telecommunications Systerms (UMTS); Physical Layer Measurements," 3GPP TS 25.215, 2005, 20 pages, V6.4.0, Release 6.
Office Action dated Jun. 9, 2015 for U.S. Appl. No. 13/495,756, 35 pages.
Notice of Allowance dated Mar. 26, 2015 for U.S. Appl. No. 14/276,688, 75 pages.
Office Action dated Apr. 16, 2015 for U.S. Appl. No. 14/521,431, 82 pages.
Office Action dated May 1, 2015 for U.S. Appl. No. 13/557,425, 33 pages.
Office Action dated May 14, 2015 for U.S. Appl. No. 14/530,605, 72 pages.
Office Action dated May 20, 2015 for U.S. Appl. No. 13/526,988, 52 pages.
Office Action dated Jun. 1, 2015 for U.S. Appl. No. 13/447,072, 38 pages.
Office Action dated Jun. 2, 2015 for U.S. Appl. No. 14/516,286, 20 pages.

* cited by examiner

US 9,094,929 B2

EVENT TAGGING FOR MOBILE NETWORKS

TECHNICAL FIELD

The subject application relates in general to managing activity within a wireless network and more particularly to providing event tagging for mobile networks.

BACKGROUND

Wireless communication networks provide a diverse set of voice and data communication services for subscribers via mobile handsets and related mobile communication devices. A terrestrial radio access network is employed to transmit and receive information wirelessly to the mobile handsets, enabling subscribers to move with their mobile handsets while maintaining communication with the wireless communication network. If an event occurs that disrupts the transmission or reception of information between the mobile handset and the radio access network, quality of communication can be negatively affected and, in severe cases, the communication can be interrupted entirely. Common causes of such events can include natural or electromechanical interference, signal attenuation from intervening objects or the like, signal scattering phenomenon, and so on. These and similar events are common causes of disruptions in wireless communication. They also present a dynamic challenge for network operators attempting to achieve high quality of service for subscribers.

In order to qualify the problem of network communication problems for analysis and correction, network operators often record call disturbances after they occur. For instance, if a particular call or data session is terminated without proper communication protocol, the termination can be tagged as a call drop. Certain information about the call drop can be recorded to study the event. Suitable information can include time of the call drop, and the base station(s) serving the particular call or data session. Since the location of network base stations are known, recording the base station(s) serving the particular call or data session gives an estimate of location of the call drop. The time of the call drop and the base station(s) and its location(s) can be recorded as an event by a mobile network.

Call drop events can be aggregated and analyzed over time as a reflection of network regions with increased likelihood of communication problems. Network operators can address these problems by bolstering radio access network infrastructure in a problem region, adding specialized equipment such as micro or mini base stations, setting up repeater base stations to avoid or mitigate interference, and so on. General knowledge of call drop events can provide a first degree of approximation of underlying problems.

SUMMARY

A simplified summary is provided herein to help enable a basic or general understanding of various aspects of illustrative, non-limiting embodiments that follow in the more detailed description and the accompanying drawings. This summary is not intended, however, as an extensive or exhaustive overview. Instead, the sole purpose of this summary is to present some concepts related to some illustrative non-limiting embodiments in a simplified form as a prelude to the more detailed description of the various embodiments that follow. It will also be appreciated that the detailed description may include additional or alternative embodiments beyond those described in this summary.

In some aspects of the subject disclosure, provided is an improved mechanism for network event modeling. The disclosed network event modeling can extrapolate known mobile device locations to estimate a position of a mobile device for a mobile device position that is at least in part unknown. Extrapolation and interpolation algorithms can be employed to extend mobile positioning beyond a known position data set, in various aspects, providing greater resolution in time and space of mobile device position, thereby providing much greater accuracy and significance to network event modeling overall.

In further aspects of the subject disclosure, periodic mobile device position data can be utilized in conjunction with network event data to estimate mobile device position in-between periodic position signaling. In at least one aspect, position of a mobile device during a network event can be estimated by extrapolating between two or more known positions of the mobile device based on relative analysis of respective times of those position determinations and of the network event. Further, an estimated position of the mobile device can be enhanced by accessing additional information in a known locality of the mobile device.

In at least one aspect, topographical information can be leveraged to refine a position estimate of a mobile device. For instance, if the mobile device is determined to be traveling at a time of the network event, a set of topographical maps representing known routes of travel for a set of modes of travel can be referenced to locate the mobile device on a particular route of travel. By locating the device on a known travel route, accuracy of a position estimate can be significantly enhanced, thereby further enhancing the location of the network event.

In other aspects, an estimate of speed of travel of the mobile device can be derived from known location and timing information. The speed of travel can be matched to one or more modes of travel to identify a particular mode of travel employed by a subscriber. By identifying the particular mode of travel, a more accurate estimate of travel route can be obtained as well. For instance, if the speed estimate matches speeds expected from motor vehicle travel, the position estimate can be confined to roads or highways to refine the estimated position. As another example, if the speed estimate matches speeds expected from cycling, the position estimate can be confined to cycling routes. As yet another example, if the speed estimate matches speeds expected from pedestrian traffic, the position estimate can be confined to pedestrian routes, and so on. Upon identifying a particular mode of travel, a topographical map of the mode of travel within a vicinity of the known location points of the mobile device can be utilized to identify a route of travel employed by the subscriber, and a position along the route of travel at which the network event occurred.

In one or more additional aspects, traffic data can be utilized to further refine position estimates of a mobile device. For instance, dynamic traffic information can give a more accurate estimate of motor vehicle speeds than static traffic information, such as a speed limit. Thus, where dynamic traffic information exists indicating that traffic on a particular road or highway is greater than or less than known static traffic information, a speed estimate of the mobile device can be further refined based on the dynamic traffic information. This can be useful in refining a position of the mobile device on a particular road or highway.

In further aspects of the subject disclosure, a position estimate of a mobile device at a time of a network event can be attributed to the network event. This position estimate can therefore be output for network event modeling. In at least one aspect, network event models based on such position estimates can be updated by later acquired information, such as subscriber-initiated position signaling following a dropped call, or automated device position signaling in response to the dropped call, or the like. Location information originated at a mobile device can often be available much later than network-identified call drop event data, as well as periodic mobile position information generated by network components. However, this later acquired information can be utilized to update or refine network event modeling once acquired at the network, in at least some disclosed aspects.

The following description and the annexed drawings set forth in detail certain illustrative aspects of the disclosed subject matter. These aspects are indicative, however, of but a few of the various ways in which the principles disclosed herein can be employed and the disclosed subject matter is intended to include all such aspects and their equivalents. Other aspects and features of the disclosed subject matter will become apparent from the following detailed description when considered in conjunction with the drawings. It will also be appreciated that the detailed description may include additional or alternative embodiments beyond those described in this summary.

DETAILED DESCRIPTION

Figure 1:
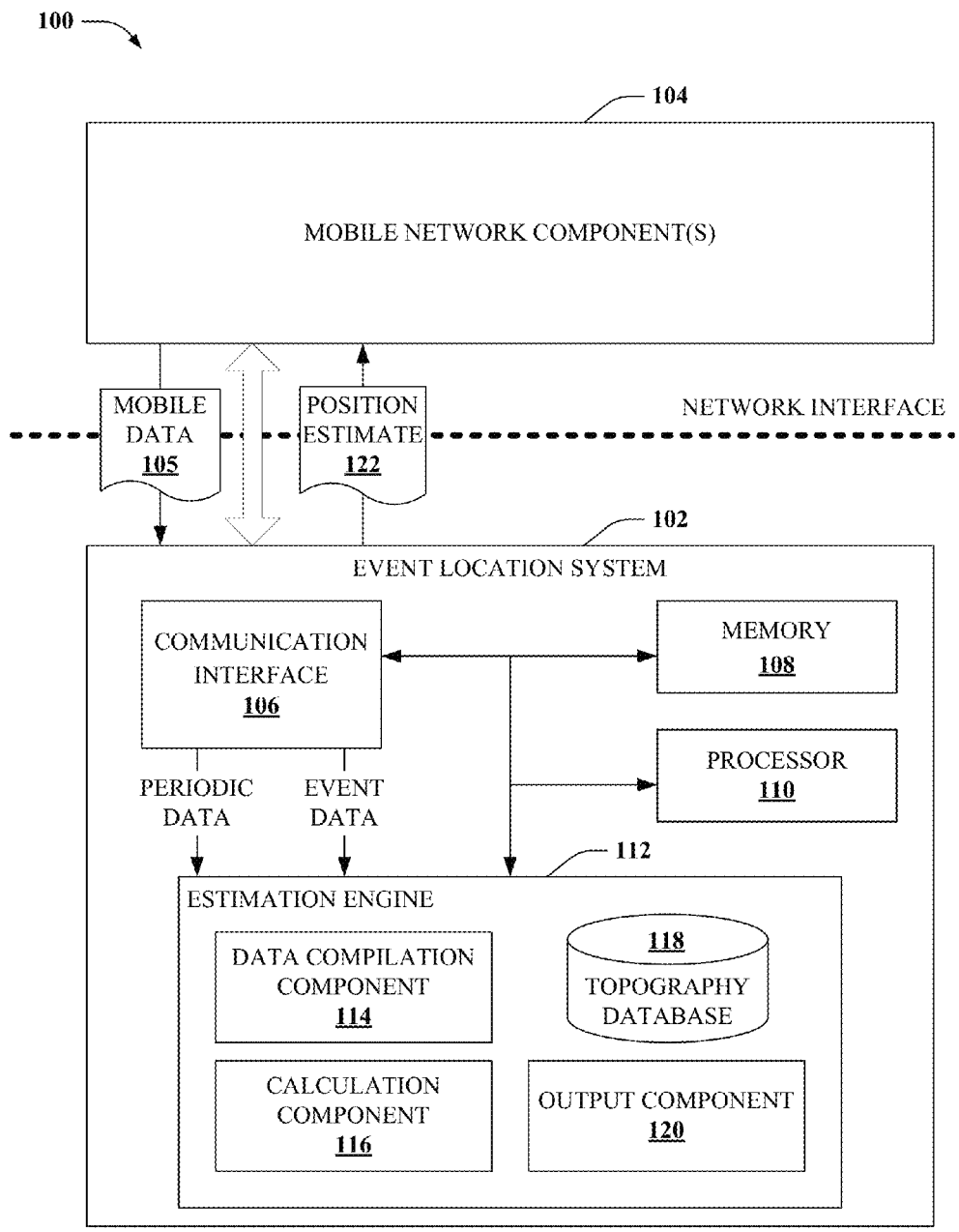
FIG. 1 illustrates a block diagram of an example system that provides network event modeling in mobile communications in aspects of the subject disclosure.

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter can be practiced without these specific details. In other instances, structures and devices are shown in block diagram form to facilitate describing the disclosed subject matter.

Where used in this application, the terms "component," "system," module", "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, a circuit, a logic gate, an object, an executable, a thread of execution, computer-executable instructions, a program, or a computer. By way of illustration, both an application running on a server/client and the server/client can be a component. One or more components can reside within a process or thread of execution and a component can be localized on one computer or distributed between two or more computers. Also, components can execute from various computer readable media having various data structures stored thereon. The components may communicate via local or remote processes such as in accordance with a signal having one or more symbols, data packets, etc. (e.g., data from one component interacting with another component in a local system, distributed system, and/or across a network such as the Internet with other systems via the signal). As another example, a component can be an apparatus with specific functionality provided by mechanical parts operated by electric or electronic circuitry, which can be operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor, a state machine, an integrated circuit, etc., therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A, X employs B, or X employs both A and B, then "X employs A or B" is satisfied under any of the foregoing instances. Moreover, articles "a" and "an" as used in the subject specification and annexed drawings should be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or other suitable data-stream or signaling-stream. The foregoing terms are utilized interchangeably in the subject specification and related drawings. Likewise, the terms "access point (AP)," "base station," "Node B," "evolved Node B (eNode B)," "home Node B (HNB)," "home access point (HAP)," and the like, refer to a wireless network component or appliance that serves and receives data, control, voice, video, sound, gaming, or other suitable data-stream or signaling-stream from a set of subscriber stations, except where context or definition warrants distinctions among the term(s). Data and signaling streams can be packetized or frame-based flows.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms) which can provide simulated vision, sound recognition and so forth.

Overview

Increase in consumer use of wireless communication and near ubiquitous penetration of mobile electronic communication devices within the consumer public has put great demand on mobile communication service providers. This demand can vary, depending on content consumed by sectors of the public. In addition, demand for different services can vary widely as a function of service, and as a function of geography. For instance, streaming media and web browsing patronized extensively by younger subscribers can be in much higher demand near high school or college campuses, as compared with average demand patterns throughout the network. In addition, messaging services and particular enterprise messaging can be in higher demand near office buildings. Voice traffic, on the other hand can be in high demand where population densities are higher in general. Because communication quality is often service dependent, temporal or systemic network communication problems can have significant impact on all services, but affect high quality services in particular.

To identify network problems, network operators can track and locate location-based network events. A location-based network event can be defined as a wireless communication action in which a wireless network has at least some information related to a location of a mobile device associated with such an action. Location-based network events can comprise a call start, a call termination, a report of substandard service, a call drop (for voice or data calls), or a similar event, or a suitable combination thereof. A problem event can comprise location-based events related to poor or substandard service, such as the report of substandard service and the call drop. By tracking problem events in time and location, anomalies can be identified within a network that observe more frequent call drop or substandard service events. These regions can be addressed with greater priority to fix the problem.

Overall, network operators track, record and analyze location-based network events as a mechanism for proper maintenance and optimization of a wireless network. Traditional methods of network diagnostics, including extensive drive testing, can be both time consuming and expensive. Moreover, results of extensive drive tests lose relevance after they are post processed and analyzed. To model dynamic conditions of wireless networks, however, network operators require information about network events in near real time. Otherwise, timely response to those events is very difficult. In this regard, as more information about a problem is discovered, the problem can be modeled with greater degrees of accuracy, leading to more effective solutions. Thus, network event modeling is one aspect of network maintenance that merits significant improvement, not only to further define modeling of problems, but to facilitate more cost effective solutions closely tailored to solve a particular problem with minimum required resources.

With new technologies, greater accuracy of network events and mobile position locations are possible. Examples of such technology include mobile location determinations from radio access network signaling, existing technologies that make use of e911 platforms for locating mobile devices, global positioning systems (GPS), assisted GPS or A-GPS, and so on. These technologies can make mobile location determinations very precise. However, network events and mobile location determinations can be uncoordinated in time, as occurrences of network events can have various causes and are often unpredictable.

Because network events themselves are often not known with much accuracy, a simple approach to estimate location of a network event is peg the network event to the cell serving a mobile device related to the network event (e.g., a mobile handset experiencing a call drop). This rough positioning can yield little practical information for location a source of interference, however. This can be especially true, for instance, in the case of a small transmitter that interferes in a non-continuous, and especially a non-periodic manner. Without more accurate estimates of network event location, quickly and accurately identifying a source of a problem event can be exhaustive, expensive, and sometimes impossible.

To address problems associated with network event modeling, the subject disclosure provides for marrying location-based network event data with mobile device location data. A best estimate of mobile device position at a time of a network event is generated and associated with a position of the network event, instead of simply associating the network event with a cell location or cell site. This enables network operators to more accurately model network related issues. Accurate modeling of issues further enables network engineers to optimize network coverage models and implement network configuration and coverage objectives, improving network performance and perception by the subscriber base.

In some aspects of the subject disclosure, interpolation or extrapolation techniques can be employed to best estimate a mobile device location from a set of known device locations, at a time of a network event. This estimation can be repeated for each network event, yielding a set of position information for each network event. In a particular aspect, topographical travel routes can be employed to best weight segments of a user's travel route and arrive at a best estimate of mobile device location from extrapolation or interpolation of known mobile locations (e.g., derived from e911 processes, mobile-originated location signaling, GPS-related position determination, periodic radio access network position determinations, . . . ) and associated times of such known mobile locations. In other aspects, multiple position estimates can be employed, in an aggregate, to reduce mobile device location error attributed to respective network events. In further aspects, speed estimates can be utilized to identify a particular mode of travel employed by a subscriber, such as motor vehicle, bicycle, pedestrian, etc. Utilizing the mode of travel, a mobile device position estimate can be located within the boundaries of a road, bicycle lane, sidewalk, building, and so on. Speed estimates can be further enhanced by use of concurrent traffic information, where available, to improve speed estimates over static traffic speed information such as a speed limit. Speed estimates can be utilized to best estimate a position along an identified route of travel at a point in time matching the network event.

In a particular aspect of the subject disclosure, network events can be captured from IuB interfaces via probe networks installed by a network operator. The IuB probes can be configured to monitor user traffic and provide specific network events of concern (e.g., problem events) to network operators. IuB based locating systems, and other location based system (LBS) platforms can be leveraged to generate position information for respective network events.

DESCRIPTION OF EMBODIMENTS

Referring to the drawings, FIG. 1 illustrates a block diagram of an example system 100 for providing network event tagging for wireless communications, according to various aspects of the subject disclosure. System 100 can comprise an event location system 102 communicatively connected with one or more mobile network components 104 over one or more network interfaces. Mobile network components 104 can comprise a set of entities configured for acquiring information pertaining to mobile location positioning. Mobile network components 104 can include entities that acquire periodic mobile positions, and entities that acquire mobile positions non-periodically, randomly, or the like. In addition, mobile network components 104 can comprise position data generated by network entities, or mobile originated position data. Examples of mobile network components 104 that generate network originated position data can include an e911 location server, an LBS platform that derives mobile device position from a network multi-lateration process, an IuB based locating system, a timed fingerprint location process (e.g., as provided in U.S. patent application Ser. No. 12/724,424 entitled Timed Fingerprint Location in Wireless Networks and filed Feb. 25, 2010, incorporated by reference herein), or another suitable network-facilitated mobile positioning mechanism. Examples of mobile network components 104 that employ mobile originated position data can include a database that receives and stores mobile-originated GPS data, or the like.

Location information for one or more mobile devices along with timing of respective location determinations can be forwarded by mobile network component(s) 104 to an event location system 102 in a mobile data file 105 over the network interface(s). Event location system 102 can comprise a communication interface 106 for sending and receiving data over the network interface(s). Thus, mobile data file 105 can be received at communication interface 106 and made available to other components of event location system 102. Mobile data file 105 can be saved, for instance, in memory 108 and accessed and utilized by a processor 110. Memory 108 can be further configured to store computer-executable instructions of event location system 102 and respective components thereof. Processor 110 can be configured to facilitate execution of the computer-executable instructions to implement functionality of event location system 102, as described in more detail below.

Event location system 102 can further comprise an estimation engine 112 configured to estimate position location information for mobile devices operating within a mobile network, for periods in which mobile device positioning is at least in part unknown. Particularly, position locations of a mobile device can be estimated from a set of known position data for the mobile device. For instance, periodic mobile device position location information can comprise location information taken at periodic times, random times, non-periodic times such as subscriber origination position reporting, e911 calls, or the like, or a suitable combination thereof. This information comprises a set of known position locations for the mobile device. Utilizing the set of known position locations and respective associated points in time, estimation engine 112 can extrapolate position locations of the mobile device at other times. As an example, a data input indicative of a geographic location of a mobile device at a first time and a second data input indicative of a second geographic location of the mobile device at a second time, can be utilized to extrapolate a third geographic location of the mobile device at a third time subsequent the first time and the second time. As another example, the data input and the second data input can be utilized to interpolate a fourth geographic location of the mobile device at a fourth time between the first time and the second time.

Estimation engine 112 can acquire position location information and respective associated times of one or more mobile devices from communication interface 106, or from memory 108. A data compilation component 114 can parse and categorize the position locations as a function of mobile device, and as a function of respective times of respective position locations. A calculation component 116 can be configured to interpolate or extrapolate position information for one or more of the mobile devices at other times, for which position location information of the respective mobile devices is not available.

In at least one aspect of the subject disclosure, calculation component 116 can reference a topography database 118 to acquire topographical information for improving estimates of mobile device locations. For instance, if a network event associated with a particular mobile device occurs at a particular point in time, calculation component 116 can look up position location information from the known set of position location information of the particular mobile device compiled by data compilation component 114, at times near the particular point in time. Additionally, topographical information can be acquired for a particular geographic region in a vicinity of position locations of the mobile device at the times near the particular point in time (e.g., see FIG. 3 and FIG. 4, infra). This topographical information can be utilized to identify suitable routes of travel within the particular geographic region to locate the mobile device along a route of travel matching the position locations at the times near the particular point in time. By locating the mobile device along a particular route of travel, accuracy of a location estimate for the mobile device can be improved over extrapolation or interpolation estimates alone.

According to further aspects of the subject disclosure, calculation component 116 can estimate a speed of the mobile device at a time proximate a network event (e.g., a dropped call). The estimated speed can be matched to predetermined speeds associated with one or more modes of travel. Example modes of travel can include vehicular travel, bicycle travel, pedestrian travel, or the like, which have fairly reliable respective ranges of speed associated therewith. Thus, for instance, a motorized mode of travel can be associated with speeds 25 miles per hour and greater, a cycling mode of travel can be associated with speeds between about 7 and about 20 miles per hour, whereas a pedestrian mode of travel can be associated with speeds between about 0 and 5 miles per hour. Other speed ranges can be associated with these modes of travel or other suitable modes of travel; the foregoing example is not exclusive. In some aspects the ranges of speeds can at least in part overlap, whereas in other aspects the ranges of speeds can be exclusive as in the example above.

According to these further aspects, upon estimating the speed of the mobile device near the time of the network event, calculation component 116 can compare the estimated speed to a set of predetermined ranges of speed associated with a set of modes of travel. A subset of the set of modes of travel can be selected from the set of modes of travel, in response to the estimated speed matching one (or more) of the ranges of speed. In the example given above, for instance, if the estimated speed of the mobile device is 40 miles per hour, then the motorized mode of travel can be selected, whereas if the estimated speed is 5 miles per hour, then the pedestrian or cycling modes of travel can be selected.

Upon selecting a mode of travel, calculation component 116 can reference topography database 118 and obtain topography information for a geographic region in which the mobile device is known to be located (from mobile location data obtained from mobile network component(s) 104) near the time of the network event. The topography information can include suitable routes of travel (e.g., roads, bicycle lanes or paths, pedestrian routes such as sidewalks, buildings, malls, etc.) for the selected subset of modes of travel. An inference can then be made that the mobile device is located along a suitable route of travel that best matches known locations of the mobile device. Because routes of travel can be relatively small in at least one geographic dimension (e.g., a bicycle lane or road having a width only one or a few meters), estimates of the location of the mobile device can be improved during times when mobile location is not accurately known. For instance, if a mobile device is inferred to be on a city street at a time of the network event, potential locations of the mobile device can be narrowed to the geographic limits of the road, at a location between known locations on the road (e.g., see FIG. 4, infra). A position estimate of the mobile device at a time of a network event can then be attributed to a position of a cause of a network event. This can significantly improve resolution of network event location estimates over estimates that place a network event in an entire cell of a wireless network. This improved resolution of network event locations can significantly improve network event time and location modeling, further enhancing effectiveness of network maintenance and optimization efforts, thereby improving overall efficacy of wireless communication services.

Figure 2:
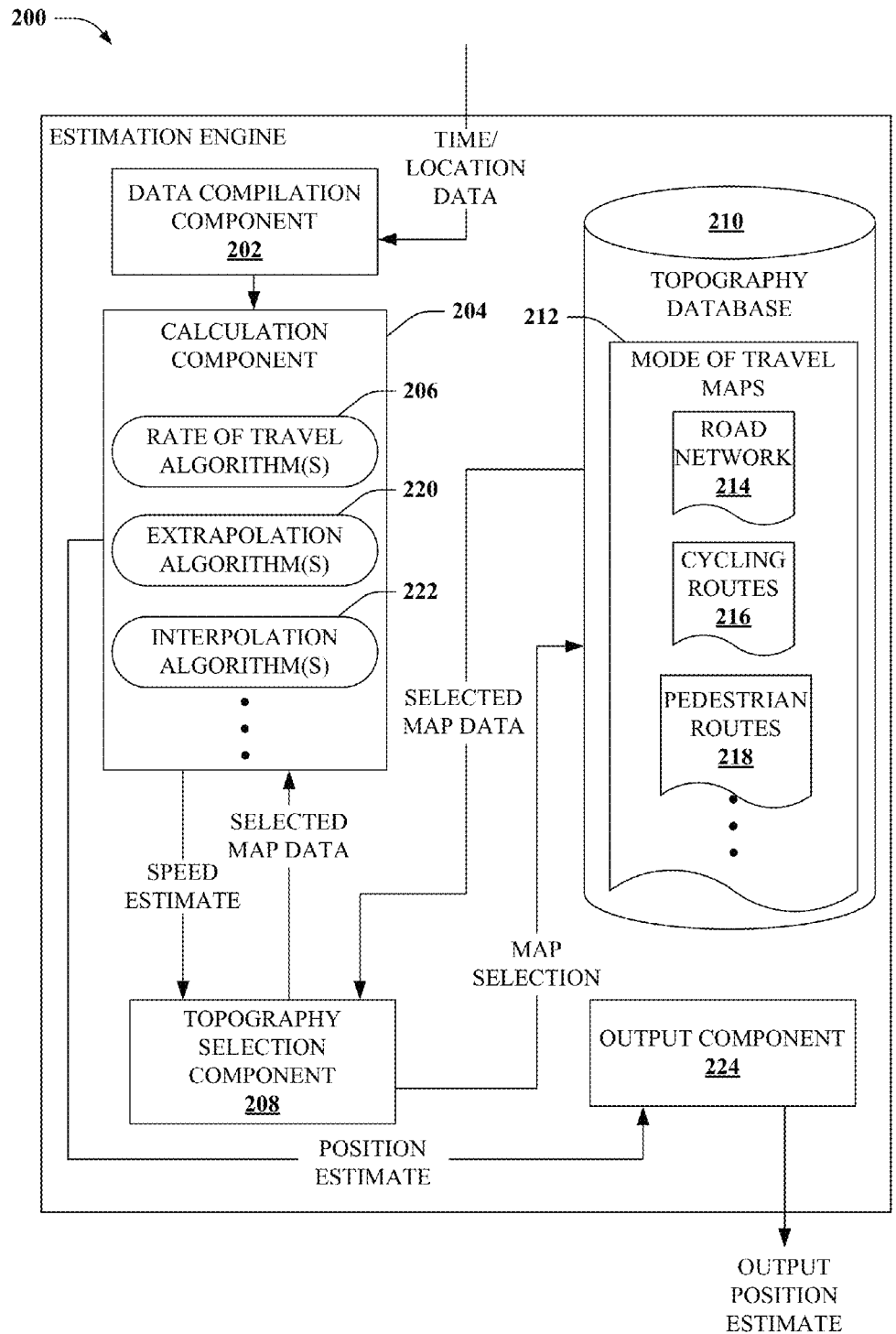
FIG. 2 depicts a block diagram of a sample estimation engine for estimating position of a mobile device at a time of a network event, in other aspects.

FIG. 2 depicts a block diagram of an estimation engine 200 according to particular aspects of the subject disclosure. Estimation engine 200 can be substantially similar to estimation engine 112 of FIG. 1, supra, in some aspects of the subject disclosure. In alternative or additional aspects, estimation engine 200 can have a subset of features of estimation engine 112 or additional features described below, in other aspects.

Estimation engine 200 can comprise a data compilation component 202 that acquires time and location event data pertinent to a wireless network. The time and location event data can include time and location positions of mobile devices operating within the wireless network, as well as time or location information of network events pertinent to the mobile devices, or a suitable combination thereof. Data compilation component 202 can parse the time and location information, and compile a multi-dimensional matrix that categorizes time and location information as a function of mobile device, network events, or other suitable categories.

A calculation component 204 can acquire the compiled matrix of time and location information and estimate positions of one or more mobile devices at times in which mobile device position is not accurately known. Particularly, calculation component 204 can estimate a position of a mobile device at a time of a network event pertaining to the mobile device. As a specific example, calculation component 204 can estimate a position of a mobile device at a time in which the mobile device experiences a call drop, utilizing a time of the call drop, and location information of the mobile device at times near the call drop.

Calculation component 204 can comprise a set of rate of travel algorithms 206 for estimating a speed of the mobile device. Rate of travel algorithms 206 can employ time and location data near a time of a network event, and output a speed estimate of the mobile device for a period of time that includes or is proximate to the time of the network event. As one example, if the time and location data indicate the mobile device covers a quarter of a mile (from two or more location points) in 30 seconds (from two or more times associated with respective location points), rate of travel algorithms 206 can output an average speed of 30 miles per hour as the speed estimate, or another suitable speed calculation (e.g., a median speed, . . . ) depending on a particular calculation(s) employed by the rate of travel algorithms 206.

The estimated speed generated by calculation component 204 can be provided to a topography selection component 208. Topography selection component 208 can compare the speed estimate to a set of correlations that link ranges of speeds with a set of modes of travel. By matching the speed estimate to the ranges of speeds, a subset of the modes of travel can be selected. A map selection(s) can be provided to a topography database 210 that stores mode of travel maps 212. Example mode of travel maps can include road network map data 214, cycling route data 216, pedestrian route data 218, and map data for other suitable modes of travel. Topography database 210 can reply with selected map data, which can be forwarded by topography selection component 208 to calculation component 204.

Upon receiving a selected map(s) of travel routes, calculation component 204 can focus on a region of the selected map(s) proximate the location information of the mobile device near the time of the network event. Further, a particular route(s) of travel can be identified that best matches known locations of the mobile device. Where the network event occurs before or after a set of known locations of the mobile device, a set of extrapolation algorithms 220 can be employed to extrapolate a position of the mobile device near or at a time of the network event. Where the network event occurs between a set of known locations of the mobile device, a set of interpolation algorithms 222 can be employed to interpolate a position of the mobile device near or at the time of the network event. In some aspects, a combination of extrapolation or interpolation can be employed, depending on time-based relatedness of known locations of the mobile device and the network event.

To estimate a position of the mobile device at a time of the network event, calculation component 204 can best match known locations of the mobile device with one or more possible routes of travel (e.g., roads, bicycle paths, pedestrian routes, . . . ). From knowledge of the time of the network event and when this time occurs relative to times of known locations of the mobile device, a position estimate for the mobile device can be inferred along a possible route(s) of travel. Where multiple possible routes of travel are identified for the mobile device, a best fit algorithm can be employed to best match position locations and estimated speed of the mobile device to a best fit route of travel to arrive at a best fit position location for the mobile device. This best fit position location can be utilized as a position location estimate.

In at least one aspect of the subject disclosure, calculation component 204 can acquire traffic speed information for a particular route of travel to refine a position location estimate of the mobile device. For instance, if the best fit route of travel is a highway, calculation component 204 can query a network (e.g., the Internet, a server of a traffic information service, municipal, country or state traffic information, . . . ) for concurrent traffic information pertaining to the best fit route of travel, or stored traffic information for prior times coinciding with the network event. Utilizing traffic speed information, a speed of the mobile device along the best fit route of travel can be refined. The refined speed can then be employed to refine a position of the mobile device along the best fit route of travel at or near the network event. This refined position can be output as the position location estimate of the mobile device.

Once the position location estimate of the mobile device at or near the network event is acquired, the position location estimate can be provided to an output component 224. Output component 224 can transmit the position location estimate to other components of a wireless network. This position location estimate can be updated to network event modeling functions, to improve the accuracy and resolution of such functions (e.g., see FIG. 5, infra).

Figure 3:
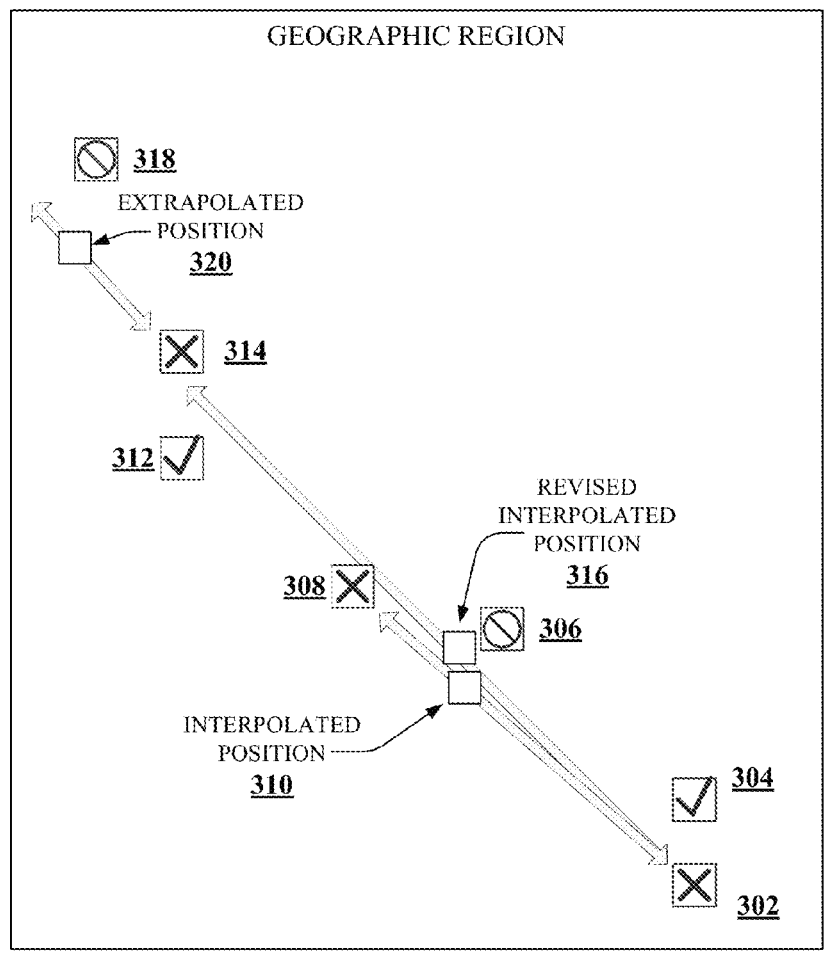
FIG. 3 illustrates a diagram of an example area map for estimating a position of a mobile device from a known set of positions of the mobile device.

FIG. 3 depicts a diagram of an example geographic region 300 in which a position location of a mobile device operating within a wireless network can be inferred for geographic region 300. In some aspects, the position location can be extrapolated from location information of the mobile device generated prior to or subsequent to a time of interest (e.g., a time at which a network event occurs). In other aspects, the position location can be interpolated from location information of the mobile device that is generated prior to and subsequent to the time of interest.

Geographic region 300 is marked with several points of interest. The points of interest are correlated at least with a time stamp, and some or all of the points of interest can be correlated with location information of a mobile device associated with the points of interest. At 302, a periodic location of the mobile device is generated at a position indicated by a location event symbol comprising an X embedded in a square. The periodic location can be generated by a component of the mobile device (e.g., periodic GPS transmission, . . . ) or can be generated by a network component (e.g., base station multilateration process, timed fingerprint location process, . . . ). At 304, a call is initiated or terminated by the mobile device. An actual location of the mobile device is indicated on geographic region 300 by a call symbol of a check mark embedded in a square, at reference number 304. The call initiation/termination can be associated at least with a time stamp for the call, and in some networks location information of the mobile device can also be generated for the call initiation/termination identifying the actual location of the mobile device at the time of the call. At 306, a problem event occurs, and a time stamp for the problem event is generated by a wireless network serving the mobile device. A position of the mobile device is marked by a network event symbol of a circle with a crossing line embedded in a square at reference number 306. At 308, a second periodic location of the mobile device is generated at the location event symbol next to reference number 308.

Utilizing the location information generated at reference numbers 302 and 308, a first approximation of a route of travel of the mobile device can be generated. This first approximation is depicted by the double-ended arrow between reference numbers 302 and 308. An interpolated position 310 of the mobile device can be estimated along the first approximation of the route of travel at the time of network event 306. Interpolated position 310 can be generated from an average speed along the first approximation of the route of travel, and a difference in time of occurrence of network event 306 and periodic locations 302 and 308.

At 312, a second call initiation/termination 312 occurs at a known time. A position of the mobile device is marked by the call symbol next to reference number 312. A second approximation of the route of travel of the mobile device is depicted by the longer double-ended arrow extending from reference number 302 to a third periodic position location 314. Additionally, a revised interpolated position 316 of the mobile device can be generated at the time of the network event along the second approximation of the route of travel. In this instance, the revised interpolated position 316 is closer to the actual location of the mobile device at a time of problem event 306, thereby improving the position estimate. In other cases, however, a revised interpolated position 316 may not be closer to the actual position of the mobile device at problem event 306. In such cases, having knowledge of topographical information of geographic region 300, including routes of travel and modes of travel of the geographic region 300, can potentially improve the estimate significantly (e.g., see FIG. 4, infra).

At 318, a second problem event occurs at a location identified by the network event symbol next to reference number 318. An extrapolated position estimate 320 for the mobile device can be generated at the time of network event 318. The extrapolated position can be generated by extending the first approximation of the route of travel or the second approximation of the route of travel beyond reference number 314. A time of network event 318 can be utilized at least in conjunction with a time of third periodic position location 314 (and potentially utilizing time and positions—where available—of call 312, second periodic position location 308, interpolated position 310, revised interpolated position 316, call 304, or first periodic position location 302) to generate a speed estimate of the mobile device along the extended approximation of the route of travel. The speed estimate can be utilized to locate the mobile device along the extended route of travel at the time of network event 318 to arrive at extrapolated position 320.

Figure 4:
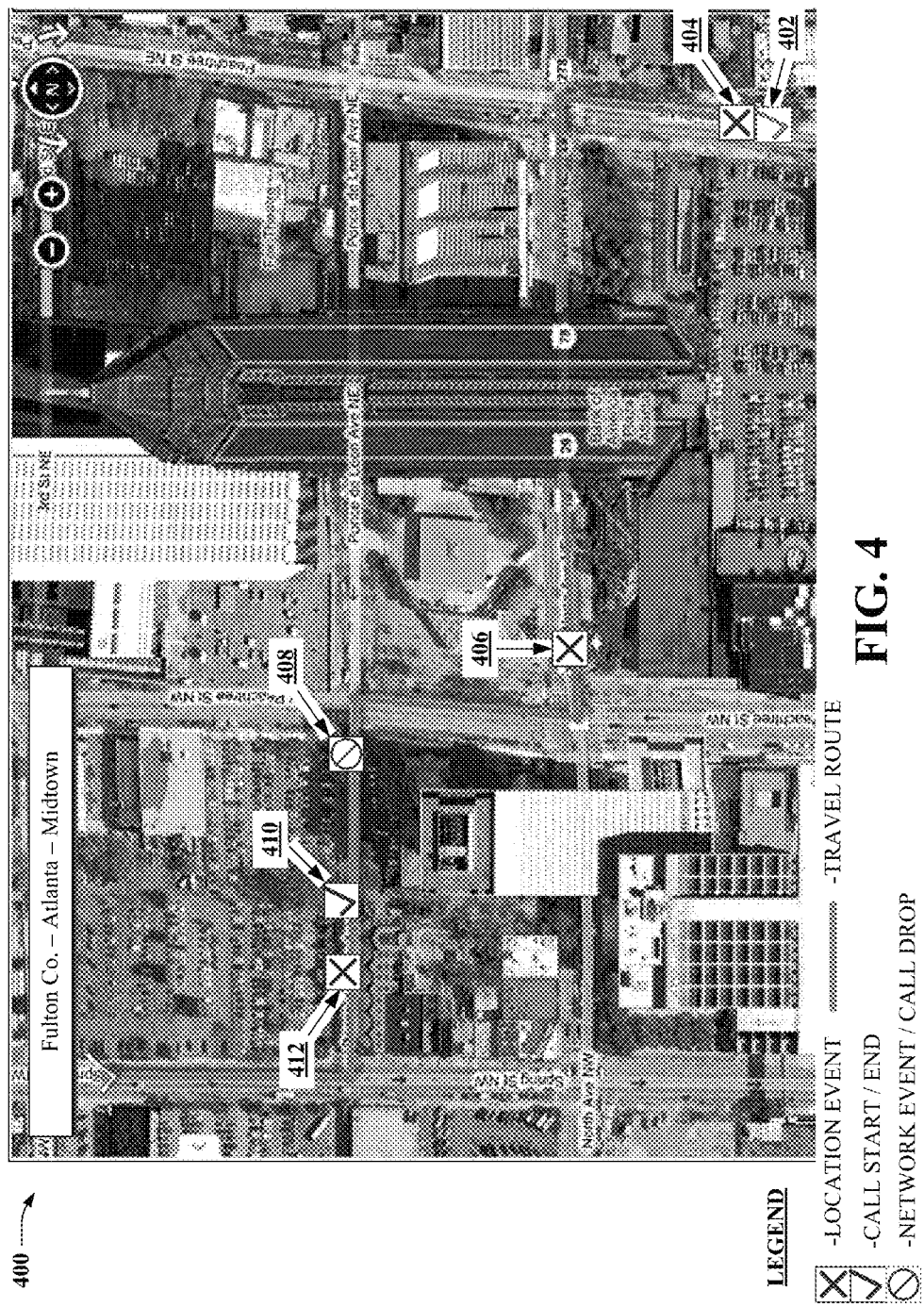
FIG. 4 depicts a diagram of a sample topographical map utilized in conjunction with estimating a position of a mobile device along a route of travel.

FIG. 4 illustrates a diagram of an example topographical map 400 for a geographic region, which can be utilized for estimating mobile position locations according to still other aspects of the subject disclosure. Wireless communication services can be provided to the geographic region by a radio access network of a mobile network (not depicted). Several network events as well as a travel route of a mobile device within topographical map 400 are depicted. A legend correlates graphical symbols with respective types of network events. An X embedded in a square is a location event symbol that represents a position of the mobile device at a periodic location determination for the mobile device, a check mark embedded in a square is a call symbol that indicates a position of the mobile device at a call initiation or termination event, and a circle with a diagonal line embedded in a square is a problem event symbol that indicates a position of the mobile device at the time of a problem event associated with the mobile device. In addition, the gold line represents a travel route of the mobile device throughout topographical map 400.

Topographical map 400 can be selected based at least in part on a speed of the mobile device, as described herein. Particularly, where the speed of the mobile device corresponds with a rate of travel that best fits a particular mode of travel, a topographical map representing the particular mode of travel can be selected, as described herein. Thus, topographical map 400 illustrating a network of city roads could be employed in response to determining a motorized vehicle mode of travel best fits the speed of the mobile device.

Several network events associated with the mobile device are depicted on topographical map 400. The network events are numbered in chronological order according to time of occurrence. The chronological order begins with the mobile device in the lower right corner of topographical map 400, with a call initiated at call symbol 402, followed shortly thereafter with a periodic position location determination 404 for the mobile device. A second periodic position location determination 406 occurs at the point indicated, and a call drop occurs for the mobile device at a problem event 408. Thereafter, a call is initiated at call symbol 410, and a third periodic position location determination 412 occurs shortly thereafter.

Utilizing location and time information at least of periodic position location determination events 404, 406 and 412, a best fit route of travel can be identified for the mobile device by determining a mode of travel and identifying within topographical map 400 suitable routes for the mode of travel. As an example, if a motorized vehicle mode of travel is determined, suitable routes can be limited to roads, highways, etc., within topographical map 400. By limiting the mobile device to suitable routes, a large portion of topographical map 400 can be eliminated, significantly increasing accuracy of position estimates of the mobile device. For instance, as compared with simple extrapolation or interpolation techniques utilized for geographic region 300 of FIG. 3, a much more accurate estimation of mobile device position can be made as compared with linear extrapolation or interpolation between two or more points.

Upon identifying a best fit route of travel for mobile device, an estimate of mobile device position at a time of problem event 408 can be made that is confined to the best fit route of travel. A position along the best fit route of travel at a time of problem event 408 can be determined by extrapolating a ratio of the time of problem event 408 and duration between position location determinations 406 and 412, to a ratio of estimated position and length along the best fit route of travel between locations of position location determinations 406 and 412, and solving for the estimated position.

In at least one aspect of the subject disclosure, the position estimate can be refined according to traffic information pertaining to traffic speeds on the best fit route of travel, or respective traffic speeds on segments of the best fit route of travel, where available. For instance, where traffic information indicates traffic speed on North Ave NE (coinciding with position location determination 406) is 25 miles per hour, speed on W Peachtree St NW is 35 miles per hour, and speed on Ponce de Leon Ave NE is 40 miles per hour, the position estimate can be refined based on suitable relationships of these speeds and calculated durations for which the mobile device is estimated to be on these respective roads. Accordingly, employing topographical map 400 and suitable routes of travel therein can significantly improve position location estimates of the mobile device, where precise location information is not known (e.g., in between periodic position determinations). Moreover, the position location estimates can be refined along a best fit route of travel based on traffic speed information for the best fit route of travel.

Figure 5:
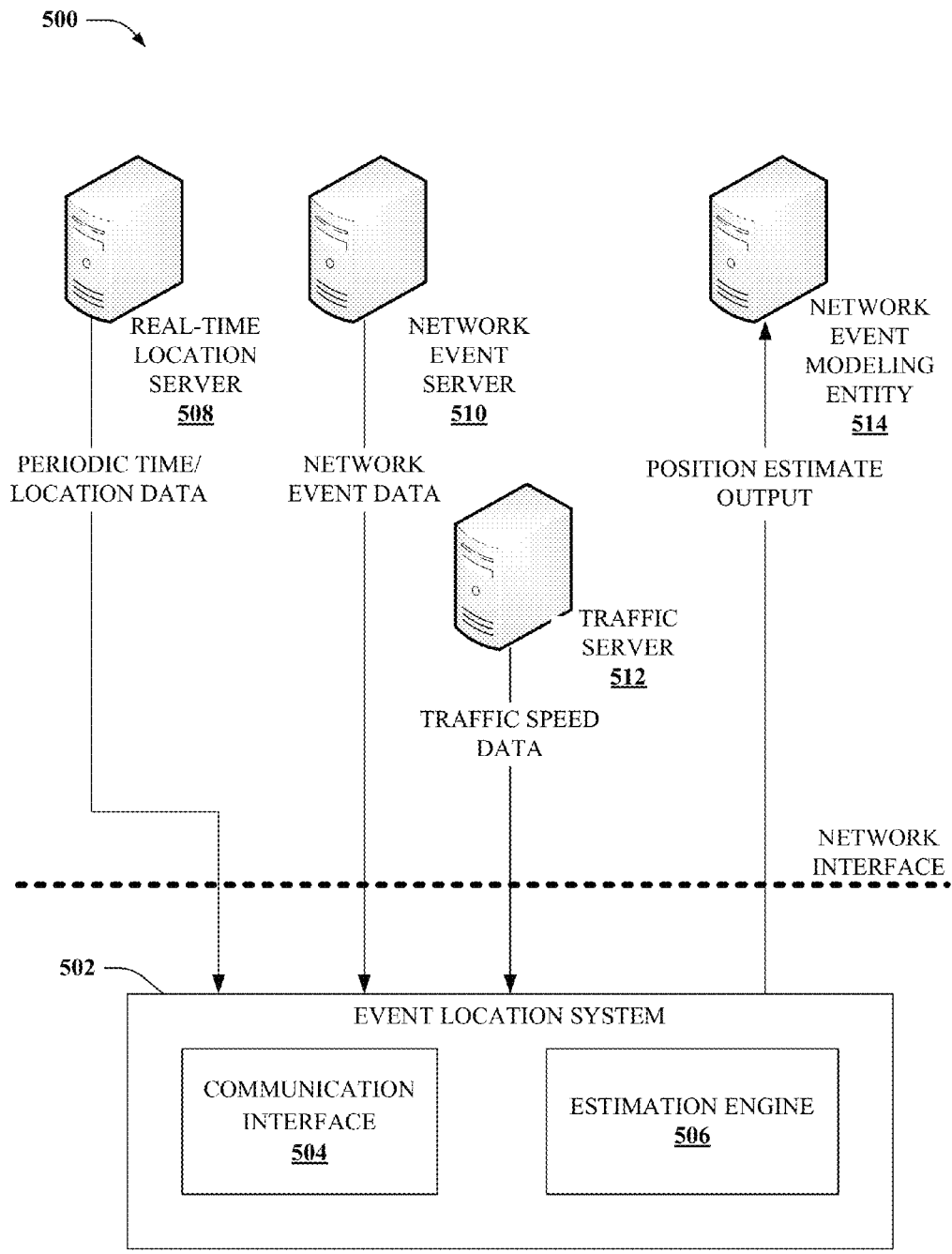
FIG. 5 illustrates a block diagram of an example network environment for aggregating network and topographical data for estimating mobile device position.

FIG. 5 illustrates a block diagram of an example system 500 that can be configured to acquire network information for estimating mobile position locations associated with network events, according to further aspects of the subject disclosure. System 500 can comprise an event location system 502 configured to generate the position locations of the mobile device at points in time coinciding with network events associated with the mobile device. A communication interface 504 can be employed for transmitting and receiving data over a network interface with network components. Data received can be provided to an estimation engine 506 configured to employ time and location data acquired by communication interface 504 for estimating the position of the mobile device at the times coinciding with network events.

As depicted, a real-time location server 508 can be configured to acquire and store mobile device location data and associated respective times thereof. The mobile device location data can comprise network-generated data, or mobile-device generated data. Moreover, the location data can be periodic, non-periodic, random or pseudo-random, or subscriber originated. At least a subset of mobile device location data also includes respective time stamp data pertaining to a particular location determination for the mobile device.

Additionally, a network event server 510 can acquire information pertaining to network events, including time of the network event, mobile device(s) affected by the network events, cell sites associated with the network events, or the like, or a suitable combination thereof. Upon occurrence of a network event, network event server 510 can transmit acquired information pertaining to the network event to event location system 502. Event location system 502 can determine a time of the network event from the acquired information and an identifier for a mobile device affected by or reporting the network event. Event location system 502 can then receive position location information for the mobile device from real-time location server 508 at times near the time of the network event. The position location information can be requested by event location system 502, or can be automatically sent by real-time location server 508 in response to a notification of the network event originating from network event server 510.

Event location system can also query or otherwise obtain traffic speed data from a traffic server 512. The traffic speed data can be employed in conjunction with determining a speed of the mobile device for one or more times, or refining a speed estimate. In some aspects, traffic speed data can be utilized in conjunction with fitting position location data to a route of travel for the mobile device near a time of the network event. In other aspects, traffic speed data can be utilized to refine a position of the mobile device along a route of travel that has been selected for the mobile device.

Upon arriving at a position estimate or refined position estimate for the mobile device at a time of the network event, event location system 502 can output the refined position estimate to a network event modeling entity 514. The position estimate can be sent alone, or in conjunction with the network event data received from network event server 510. The position estimate can be utilized by network event modeling entity to improve estimates of a location of the network event itself. When utilized for multiple network events over time, network event modeling in general can be greatly improved. Particularly, event modeling can be performed with greater spatial resolution, providing more accurate information about the location of network events, thereby improving capability of network technicians of discovering a source of such events and potentially reducing the cost of such discovery. Accordingly, system 500 can provide significant benefits for wireless network operators in maintaining and optimizing wireless networks.

The aforementioned systems have been described with respect to interaction between several systems, components or communication interfaces. It should be appreciated that such systems and components can include those components or sub-components specified therein, some of the specified components or sub-components, or additional components. For example, a system could include event location system 102 comprising mobile estimation engine 200, real-time location server 508, network event server 510 and traffic server 512, or a different combination of these or other entities. Sub-components could also be implemented as modules communicatively coupled to other modules rather than included within parent modules. Additionally, it should be noted that one or more components could be combined into a single component providing aggregate functionality. For instance, calculation component 112 can include topography selection component 124, or vice versa, to facilitate estimating mobile device position and selecting topographical data in conjunction with the estimating, by way of a single component. The components can also interact with one or more other components not specifically described herein but known by those of skill in the art.

Figure 6:
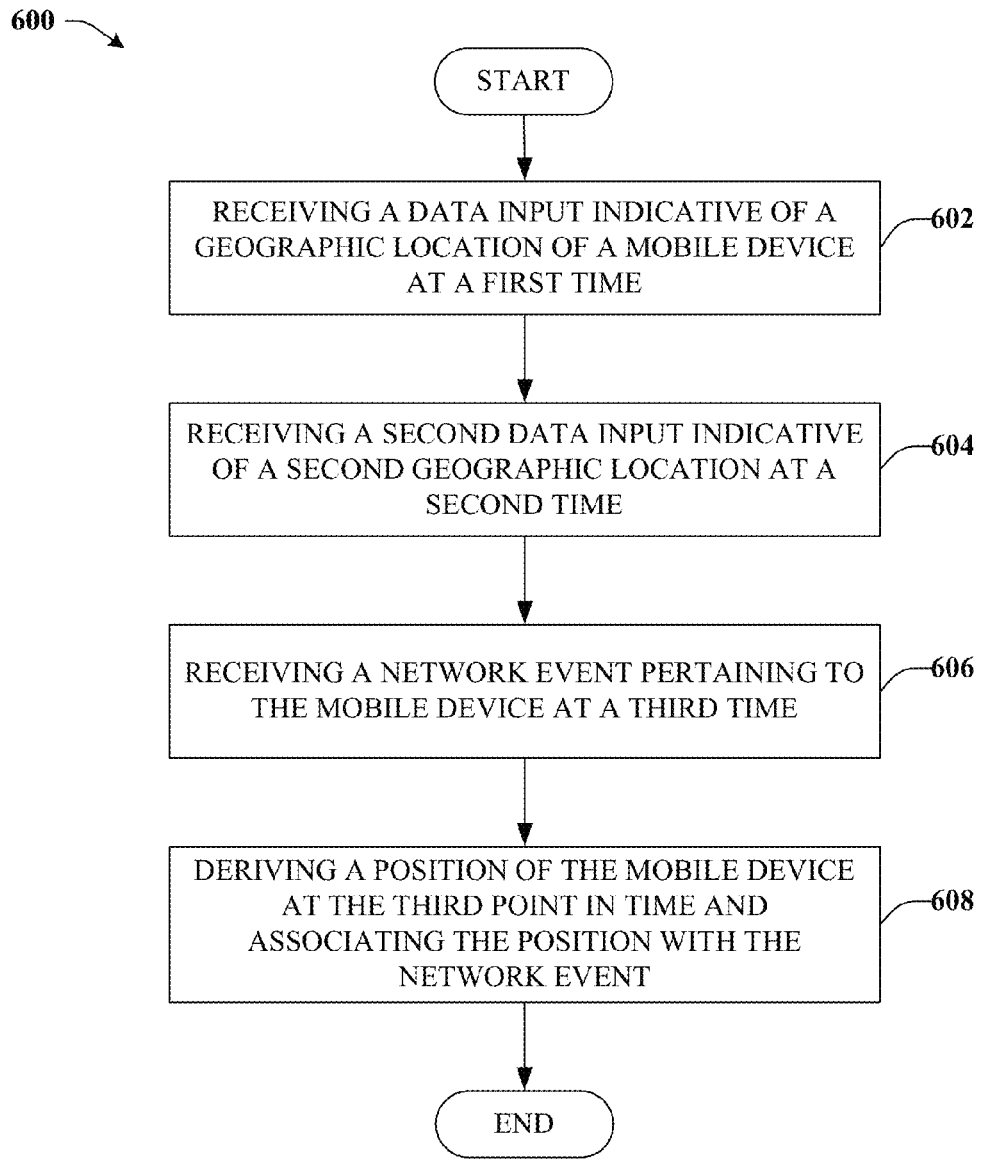
FIG. 6 depicts a flowchart of an example method for providing network event modeling according to one or more aspects.
Figure 7:
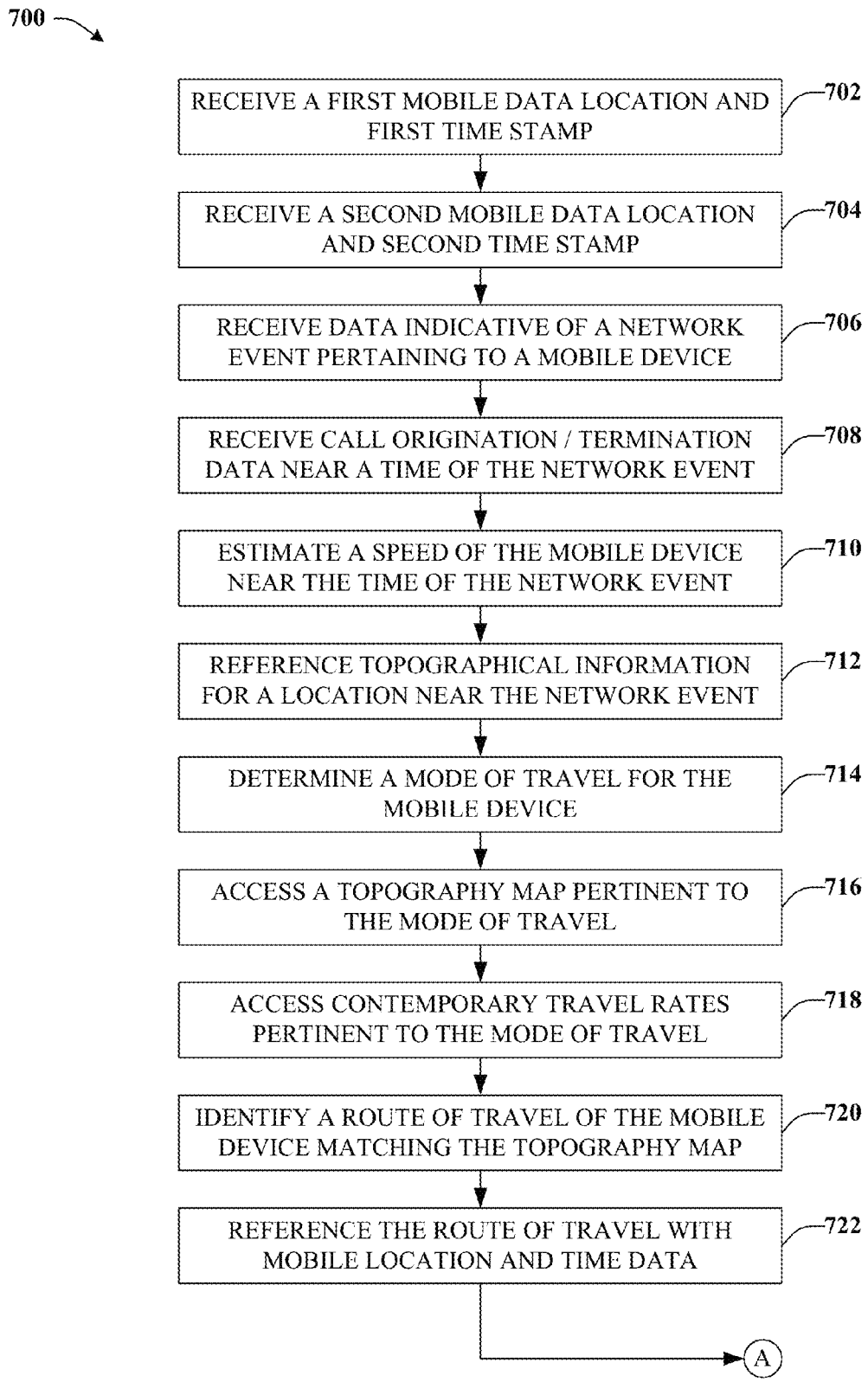
FIGS. 7 and 8 illustrate a flowchart of an example method for improving network event modeling with topographical data in mobile position locations.
Figure 8:
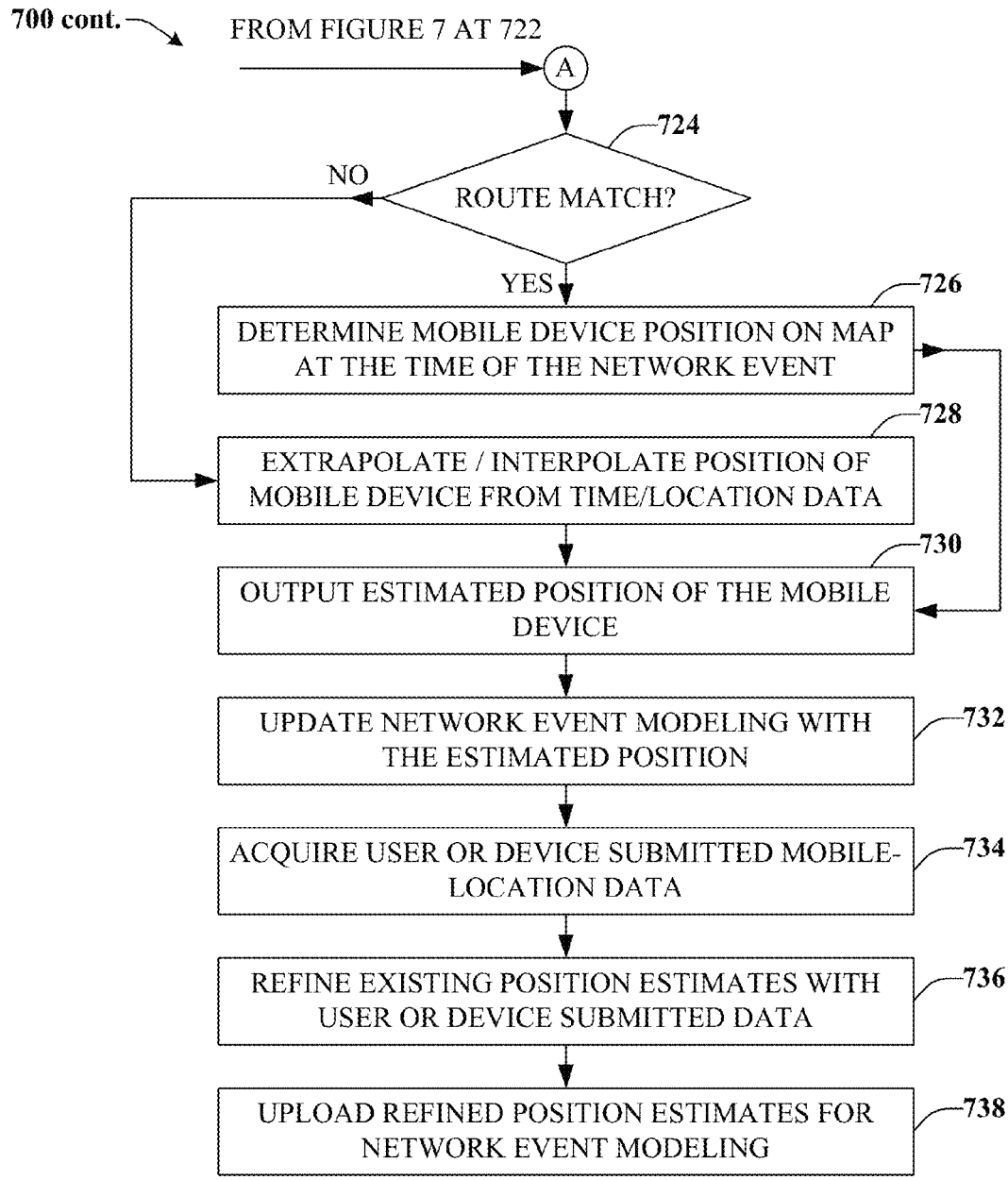

FIGS. 6, 7 and 8 illustrate various methods in accordance with one or more of the various embodiments disclosed herein. While, for purposes of simplicity of explanation, the methods are shown and described as a series of acts, it is to be understood and appreciated that the various embodiments are not limited by the order of acts, as some acts may occur in different orders or concurrently with other acts from that shown and described herein. For example, those skilled in the art will understand and appreciate that a method could alternatively be represented as a series of interrelated states or events, such as in a state diagram. Moreover, not all illustrated acts may be required to implement a method in accordance with the various embodiments. Additionally, it should be further appreciated that the methods disclosed hereinafter and throughout this specification are capable of being stored on an article of manufacture to facilitate transporting and transferring such methods to computers. The term article of manufacture, as used herein, is intended to encompass a computer program accessible from any computer-readable device, carrier, or media.

FIG. 6 illustrates a flowchart of an example method 600 of operating a system that includes at least one processor to provide improved mobile device positioning according to aspects of the subject disclosure. At 602, method 600 can comprise receiving, by the system, a first data input indicative of a first geographic location of a mobile device. The method can also comprise receiving, by the system, information indicative of a first time at which the geographic location of the mobile device is determined. At 604, method 600 can comprise receiving, by the system, a second data input indicative of a second geographic location of the mobile device. Moreover, the second data input can include information indicative of a second time at which the second geographic location of the mobile device is determined. At 606, method 600 can comprise receiving, by the system, indication of a network event pertaining to the mobile device. The indication of the network event can include information indicative of a third time at which the network event occurs. At 608, method 600 can comprise deriving, by the system, a position of the mobile device at the third point in time based at least on the first data input and the second data input, and associating the derived position of the mobile device with the network event. Method 600 can also comprise outputting, by the system, the derived position to a component of a wireless network related to storing network event information. Such a component can also be configured for compiling time and location information of network events.

FIG. 7 illustrates a flowchart of an example method 700 according to still other aspects of the subject disclosure. At 702, method 700 can comprise receiving a first mobile data location indicative of a first geographic location of a mobile device, and a first time stamp corresponding with the first mobile data location. At 704, method 700 can comprise receiving a second mobile data location indicative of a second geographic location of the mobile device, and a second time stamp corresponding with the second mobile data location. At 706, method 700 can comprise receiving data indicative of a network event pertaining to the mobile device. At 708, method 700 can comprise receiving call origination/termination data near a time of the network event. The call origination/termination data can include respective time stamps for respective call origination events or call termination events pertaining to the mobile device. Additionally, the call origination/termination data can include respective location determinations for a subset of the call origination events or call termination events.

At 710, method 700 can comprise estimating a speed of the mobile device near the time of the network event. Speed can be estimated utilizing time and location information of the mobile device acquired from the first mobile data location, second mobile data location, as well as one or more other mobile data locations, and call origination/termination data near the time of the network event, or a subset thereof. In at least one aspect, the estimated speed can be refined utilizing traffic speeds within a vicinity of the mobile device near the time of the network event. The traffic speeds can be particular to a mode of travel identified for the mobile device. For instance, upon acquiring an initial speed estimate, a route of travel can be identified and traffic information for that route of travel obtained. Utilizing the traffic information, accuracy of the identified mode of travel and route of travel can be re-analyzed and re-configured at least in part from the traffic speed data for the route of travel. Where speed estimates of the mobile device do not match the traffic speed data, re-analysis can comprise updating speed estimates, analyzing other potential modes of travel or routes of travel, or the like, to improve a best fit for the mode of travel or the route of travel, or a suitable combination thereof. In other words, the traffic speeds can be utilized as a feedback input to verify or constrain initial data inputs for estimated speed calculations, mode of travel selections, or route of travel selections.

At 712, method 700 can comprise referencing topographical information nearing a pre-defined vicinity of the first geographic location, the second geographic location or the network event. At 714, method 700 can comprise determining a mode of travel for the mobile device. Suitable modes of travel can comprise motorized modes of travel, cycling modes of travel, or pedestrian modes of travel, or the like. The mode of travel can be determined at least in part from comparing an estimate of speed of the mobile device to predetermined ranges of speed associated with respective modes of travel.

At 716, method 700 can comprise accessing topography information from the topography map pertinent to the determined mode of travel. At 718, method 700 can comprise accessing contemporary speeds of travel pertinent to the mode of travel. The speeds of travel can be concurrent speeds (e.g., real-time) or post-processed information at a previous time coinciding with the time of the network event. At 720, method 700 can comprise identifying a route of travel of the mobile device from the time and location information of the mobile device, the estimated speed information, or a combination thereof. At 722, method 700 can comprise referencing the route of travel with the mobile location and time information to position the mobile device along the route of travel according to the time information.

Referring now to FIG. 8, method 700 continues at 724 and performs a determination as to whether a suitable match exists between geographic location of route of travel and the mobile location and time information. If so, method 700 proceeds to 726. Otherwise, method 700 proceeds to 728.

At 726, method 700 can comprise determining mobile device position along the route of travel on the topographical map at the time of the network event 726. The position can be refined by interpolating or extrapolating mobile device time and location information with traffic speed data for the route of travel or respective traffic speeds for respective subsets of the route of travel. From 726, method 700 can proceed to 730.

At 728, method 700 can comprise extrapolating or interpolating a position of the mobile device directly from time and location data, in response to failing to identify a route of travel for the mobile device. The position of the mobile device can be refined utilized general traffic speeds for the vicinity of the network event to attempt to improve the position. From 728, method 700 can proceed to 730.

At 730, method 700 can comprise outputting an estimated position of the mobile device in response to receiving the data indicative of the network event. At 732, method 700 can comprise updating network event modeling with the estimated position. At 734, method 700 can comprise acquiring user or device submitted mobile location data near a time of the network event. The user or device submitted mobile location data can be acquired, for instance, from a third-party network server that provides user-submitted locations services, and makes acquired data available for network modeling functionality. At 736, method 700 can comprise refining the estimated position with the user or device submitted data. For instance, where user or device submitted data is available at a later time than network-generated information, the user or device submitted data (e.g., GPS data, . . . ) can be used to further refine estimated mobile device positions, as well as test accuracy of mobile position estimations utilizing techniques disclosed herein. At 738, method 700 can comprise uploading refined position estimates for refining, updating or appending network event modeling.

Figure 9:
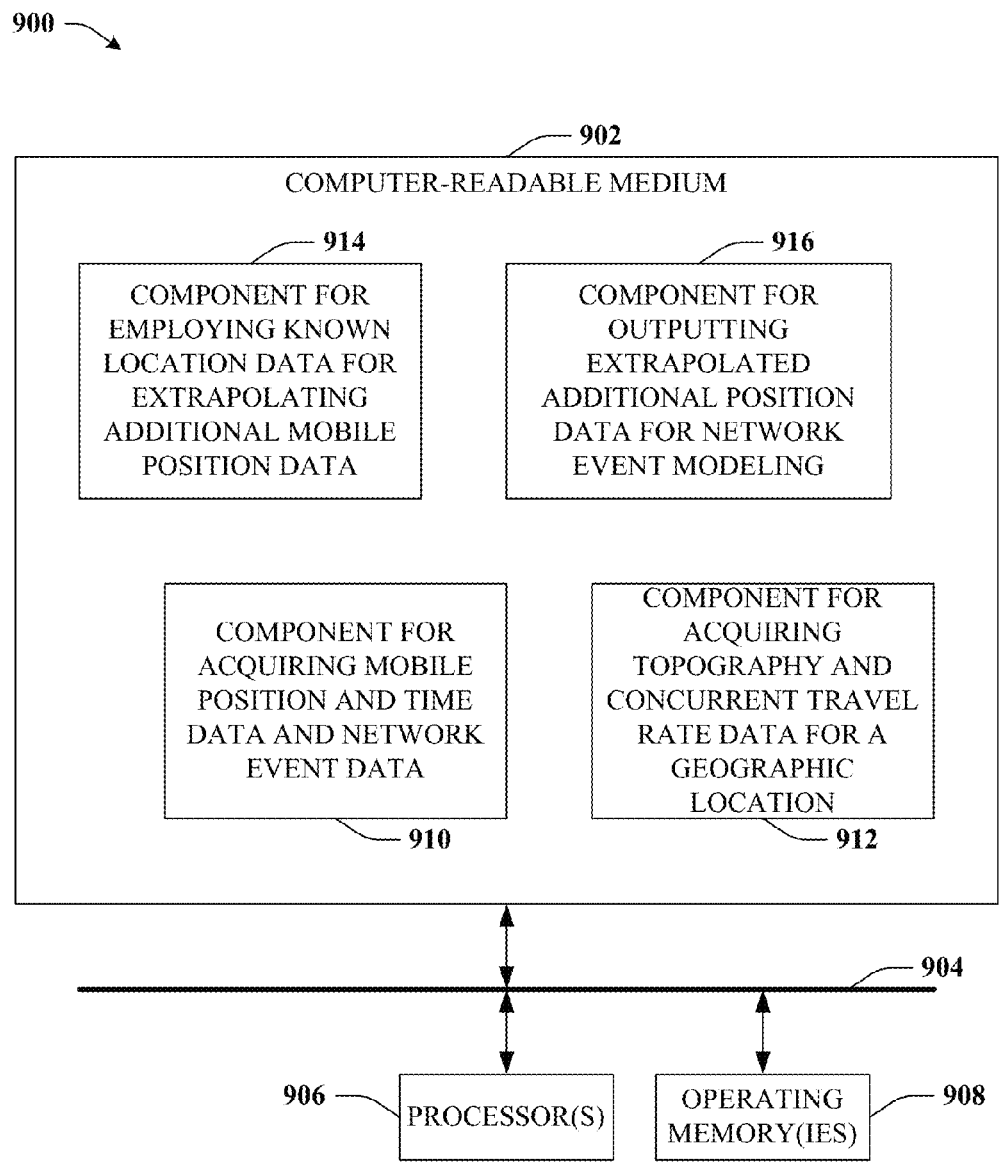
FIG. 9 depicts a block diagram of an example computer-readable medium for providing network event modeling according to particular aspects.

FIG. 9 illustrates an example apparatus 900 for implementing network event modeling for wireless networking according to further aspects of the subject disclosure. For instance, apparatus 900 can reside at least partially within a wireless communication network and/or within a wireless receiver such as a node, base station, access point, user terminal, personal computer coupled with a mobile interface card, or the like. It is to be appreciated that apparatus 900 is represented as including functional blocks, which can be functional blocks that represent functions implemented by a hardware, software, or combination thereof (e.g., firmware). In some aspects, the functional blocks can represent non-transitory computer-readable media. In other aspects, the functional blocks can represent transitory computer-readable media.

Apparatus 900 can comprise a computer-readable medium 902 comprising one or more computer-executable instructions that can be accessed over a data communication interface 904. Data communication interface 904 can include a communication bus, a media reader (e.g., disc reader, disk reader, drive reader, . . . ), a data ribbon, a wired data interface, a wireless data interface, a network communication interface, a network signaling interface, or a suitable combination thereof. Additionally, the computer-executable instructions can be stored in an operating memory 908 or executed by a processor 906 to facilitate functionality of apparatus 900.

As depicted, computer-readable medium 902 can comprise a first computer-executable instruction 910 for acquiring mobile position and corresponding time data and network event data. Particularly, the position data can be for times near a time of occurrence of a network event. Additionally, computer-readable medium 902 can comprise a second computer-executable instruction 912 for acquiring topography and concurrent travel rate data for a geographic location related to the position data. Computer-readable medium 902 can also comprise a third computer-executable instruction 914 can be configured for employing a set of known geographic locations for the mobile device at respective predetermined times for extrapolating or interpolating an additional position of the mobile device at a time coinciding with the network event involving the mobile device. In some aspects, the extrapolating or interpolating can employ the topographical data related to the position data. In a particular aspect, the extrapolating or interpolating can employ a route of travel pertaining to the topographical data. In at least one alternative or additional aspect, the extrapolating or interpolating can employ the concurrent travel rate data pertinent to the route of travel. In addition to the foregoing, computer-readable medium 902 can comprise a fourth executable instruction 916 that can be configured for outputting the extrapolated additional position of the mobile device as an estimated position of the network event. This output can be employed for improving accuracy of network event modeling.

Figure 10:
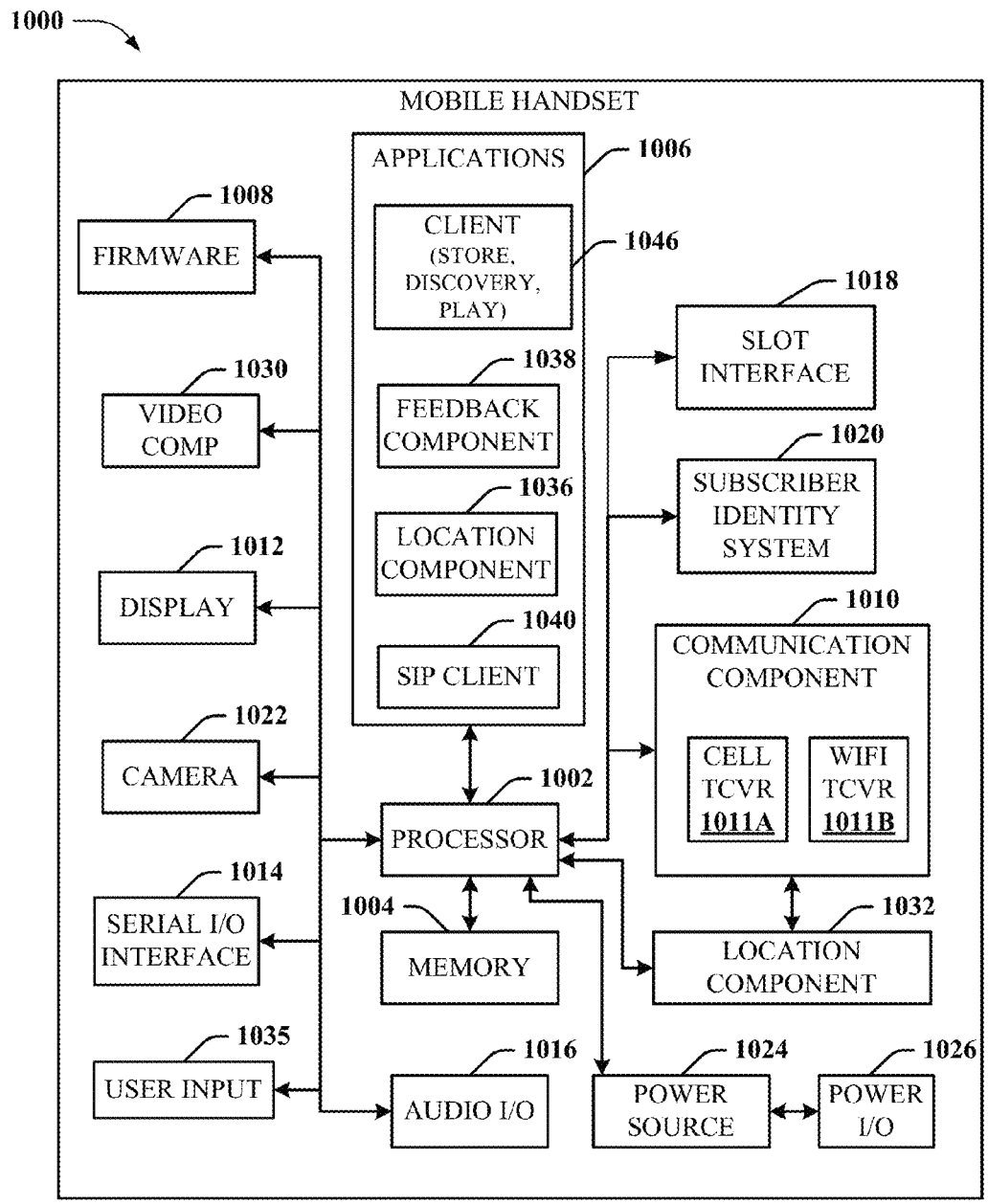
FIG. 10 illustrates a block diagram of a sample mobile handset that can be configured for operation in conjunction with one or more disclosed aspects.

Referring now to FIG. 10, illustrated is a schematic block diagram of an illustrative mobile device 1000 capable of maintaining concurrent wireless communication with a radio access network and an access point base station, in accordance with some embodiments described herein. Although a mobile handset 1000 is illustrated herein, it will be understood that other devices can be a mobile device, and that the mobile handset 1000 is merely illustrated to provide context for the embodiments described herein. The following discussion is intended to provide a brief, general description of an example of a suitable environment 1000 in which some of the various disclosed embodiments can be facilitated or implemented. While the description includes a general context of computer-executable instructions embodied on a computer readable storage medium, those skilled in the art will recognize that the various aspects also can be implemented in combination with other program modules or as a combination of hardware, software or firmware.

Applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices. Further, illustrated aspects of the subject disclosure can be practiced in distributed computing environments where certain tasks are performed by remote processing devices that are linked through a communications network (e.g., mobile handset 1000 communicating through a mobile communication network). In a distributed computing environment, systems and system components, as well as program modules can be located in both local and remote memory storage devices.

A computing device such as mobile handset 1000 can include a variety of media, which can include computer-readable storage media or communication media, which two terms are used herein differently from one another as follows.

Computer readable storage media can be any available storage media that can be accessed by a computer (e.g., mobile handset 1000) and includes both volatile and nonvolatile media, removable and non-removable media. By way of example and not limitation, computer-readable storage media can be implemented in connection with any method or technology for storage of information, such as computer-readable instructions, data structures, program modules or unstructured data. Computer-readable storage media can include, but is not limited to, RAM, ROM, EEPROM, flash memory or other memory technology, CD ROM, digital versatile disk (DVD) or other optical disk storage, magnetic cassettes, magnetic tape, magnetic disk storage or other magnetic storage devices, or other tangible or non-transitory media which can be used to store desired information. Computer-readable storage media can be accessed by one or more local or remote computing devices, e.g., via access requests, queries or other data retrieval protocols, for a variety of operations with respect to the information stored by the medium.

Communication media embodies computer-readable instructions, data structures, program modules or other structured or unstructured data in a modulated data signal such as a carrier wave or other transport mechanism, and includes any suitable information delivery or transport media. The term "modulated data signal" or signals means a signal that has one or more of its characteristics set or changed in such a manner as to encode information in one or more signals. By way of example, and not limitation, communication media includes wired media such as a wired network or direct-wired connection, and wireless media such as acoustic, RF, infrared and other wireless media.

Mobile handset 1000 includes a processor 1002 for controlling and processing onboard operations and functions. A memory 1004 interfaces to the processor 1002 for storage of data and one or more applications 1006 (e.g., user-generated service feedback, network event feedback, user-originated mobile location transmission, etc.). Other applications can include voice recognition of predetermined voice commands that facilitate receipt of user input. The applications 1006 can be stored in the memory 1004 and/or in a firmware 1008, and executed by the processor 1002 from either or both the memory 1004 or the firmware 1008. The firmware 1008 can also store startup code for execution in initializing mobile handset 1000. A communications component 1010 interfaces to the processor 1002 to facilitate wired/wireless communication with external systems, e.g., cellular networks, VoIP networks, Wi-Fi networks, and so on. Here, the communications component 1010 can also include a suitable cellular transceiver 1011A (e.g., a global system for mobile communication (GSM) transceiver, a code division multiple access (CDMA) transceiver, . . . ) or an unlicensed transceiver 1011B (e.g., Wi-Fi, WiMAX) for corresponding signal communications. Mobile handset 1000 can be a device such as a cellular telephone, a PDA with mobile communications capabilities, and messaging-centric devices, and so on. The communications component 1010 can also facilitate communications reception from terrestrial radio networks (e.g., broadcast), digital satellite radio networks, and Internet-based radio services networks.

Mobile handset 1000 includes a display 1012 for displaying text, images, video, telephony functions (e.g., a Caller ID function), setup functions, and for user input. For example, the display 1012 can also be referred to as a "screen" that can accommodate the presentation of multimedia content (e.g., music metadata, messages, wallpaper, graphics, video, etc.). The display 1012 can also display videos and can facilitate the generation, editing and sharing of graphical or video applications. A serial I/O interface 1014 is provided in communication with the processor 1002 to facilitate wired and/or wireless serial communications (e.g., USB, and/or IEEE 1094) through a hardwire connection, and other serial input devices (e.g., a keyboard, keypad, and mouse). This supports updating and troubleshooting mobile handset 1000, for example. Audio capabilities are provided with an audio I/O component 1016, which can include a speaker for the output of audio signals related to, for example, indication that the user pressed the proper key or key combination to initiate the user feedback signal. The audio I/O component 1016 also facilitates the input of audio signals through a microphone to record data and/or telephony voice data, and for inputting voice signals for telephone conversations.

Mobile handset 1000 can include a slot interface 1018 for accommodating a SIC (Subscriber Identity Component) in the form factor of a card Subscriber Identity Module (SIM) or universal SIM 1020, and interfacing the SIM card 1020 with the processor 1002. However, it is to be appreciated that the SIM card 1020 can be manufactured into the handset 1000, and updated by downloading data and software.

The handset 1000 can process IP data traffic through the communication component 1010 to accommodate IP traffic from an IP network such as, for example, the Internet, a corporate intranet, a home network, a personal area network, etc., through an ISP or broadband cable provider. Thus, VoIP traffic can be utilized by the handset 1000 and IP-based multimedia content can be received in either an encoded or decoded format.

A graphics processing component 1022 (e.g., a camera) can be provided for decoding encoded multimedia content. The graphics processing component 1022 can aid in facilitating the generation, playback, editing and sharing of graphical media. Mobile handset 1000 also includes a power source 1024 in the form of batteries and/or an AC power subsystem, which power source 1024 can interface to an external power system or charging equipment (not shown) by a power I/O component 1026.

Mobile handset 1000 can also include a video component 1030 for processing video content received and, for recording and transmitting video content. For example, the video component 1030 can facilitate the generation, editing and sharing of video media. A location tracking component 1032 facilitates geographically locating mobile handset 1000. A user input component 1034 facilitates the user inputting information, responses or selections into mobile handset 1000. The user input component 1034 can include such input device technologies such as a keypad, keyboard, mouse, stylus pen, or touch screen, for example.

Referring again to the applications 1006, a location component 1036 facilitates user-originated transmission of position location data for mobile handset 100 to a network serving mobile handset 1000. A feedback component 1038 can be provided that facilitates user-originated problem event reporting, for instance when a call drops or when service is deemed to be poor by the subscriber. The applications 1006 can also include a client 1042 that provides at least the capability of discovery, play and store of multimedia content, for example, music.

Mobile handset 1000, as indicated above relates to the communications component 1010, includes an indoor network radio transceiver 1011B (e.g., Wi-Fi transceiver). This function supports the indoor radio link, such as IEEE 802.11 (a, b, g, n, . . . ), and other 802.xx protocols (e.g., BlueTooth, Zigbee, . . . ) in the event mobile handset 1000 comprises a dual-mode handset. Mobile handset 1000 can accommodate at least satellite radio services through a handset that can combine wireless voice and digital radio chipsets into a single handheld device.

Figure 11:
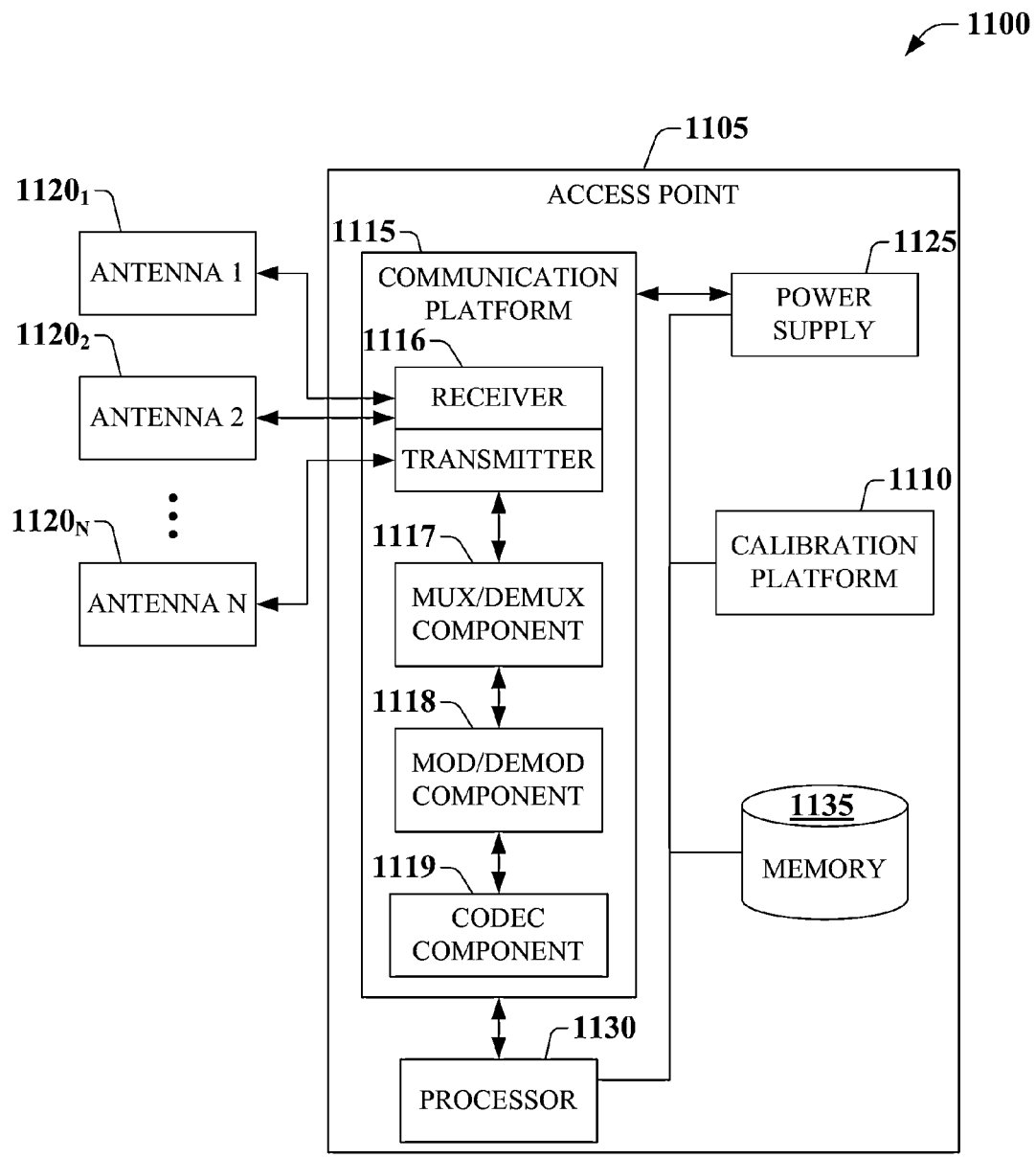
FIG. 11 illustrates a block diagram of an example radio access network device that can be operable for facilitating various disclosed aspects.

FIG. 11 illustrates a block diagram of an example embodiment of an access point (AP 1105) to implement and exploit one or more features or aspects of the disclosed subject matter. For instance, AP 1105 can facilitate network-generated position determinations for mobile device, whether periodic, non-periodic, and so on. Moreover, AP 1105 can include one or more network-based systems or components disclosed herein, including event location system 102 of FIG. 1, estimation engine 200 of FIG. 2, event location system 502 of FIG. 5, etc.

In embodiment 1100, AP 1105 can receive and transmit signal(s) (e.g., attachment signaling) from and to wireless devices like access terminals, wireless ports and routers, wireless handsets, Femto cell terminals, or the like, through a set of antennas $1120_1$-$1020_N$ (N is a positive integer). It should be appreciated that antennas $1120_1$-$1020_N$ can comprise electronic components and associated circuitry that provides for processing and manipulation of received signal(s) and signal(s) to be transmitted. In an aspect, communication platform 1115 includes a receiver/transmitter 1116 that can convert wireless signals from analog to digital upon reception, and from digital to analog upon transmission. In addition, receiver/transmitter 1116 can divide a single data stream into multiple, parallel data streams, or perform a reciprocal operation. Coupled to receiver/transmitter 1116 is a multiplexer/demultiplexer 1117 that facilitates manipulation of signal in time and frequency space. Electronic component 1117 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM) . . . . In addition, multiplexer/demultiplexer component 1117 can scramble and spread information (e.g., codes) according to substantially any code known in the art; e.g., Hadamard-Walsh codes, Baker codes, Kasami codes, polyphase codes, and so on. A modulator/demodulator 1118 is also a part of communication platform 1115, and can modulate information according to multiple modulation techniques, such as frequency modulation, amplitude modulation (e.g., M-ary quadrature amplitude modulation (QAM), with M a positive integer), phase-shift keying (PSK), and the like. Communication platform 1115 can also include a coder/decoder (codec) component 1119 that facilitates decoding received signal(s), and coding signal(s) to convey.

Access point 1105 also includes a processor 1135 configured to confer functionality, at least in part, to substantially any electronic component in AP 1105. In particular, processor 1135 can facilitate determination of propagation delay information of RF signal, or microwave signal, among communication platform 1115 and antennas $1120_1$-$1020_N$, whether alone or in conjunction with one or more other AP(s) (not depicted), to facilitate generation of network-originated position information of a mobile device in accordance with various aspects and embodiments disclosed herein. Power supply 1125 can attach to a power grid and include one or more transformers to achieve power level that can operate AP 1105 components and circuitry. Additionally, power supply 1125 can include a rechargeable power component to ensure operation when AP 1105 is disconnected from the power grid, or in instances, the power grid is not operating.

Processor 1135 can also be functionally connected to communication platform 1115 and can facilitate operations on data (e.g., symbols, bits, or chips) for multiplexing/demultiplexing, such as effecting direct and inverse fast Fourier transforms, selection of modulation rates, selection of data packet formats, inter-packet times, etc. Moreover, processor 1135 can be functionally connected, via a data or system bus, to calibration platform 1112 and other components (not shown) to confer, at least in part functionality to each of such components.

In AP 1105, memory 1145 can store data structures, code instructions and program modules, system or device information, code sequences for scrambling, spreading and pilot transmission, location intelligence storage, determined delay offset(s), over-the-air propagation models, and so on. Processor 1135 is coupled to the memory 1145 in order to store and retrieve information necessary to operate and/or confer functionality to communication platform 1115, calibration platform 1112, and other components (not shown) of access point 1105.

Figure 12:
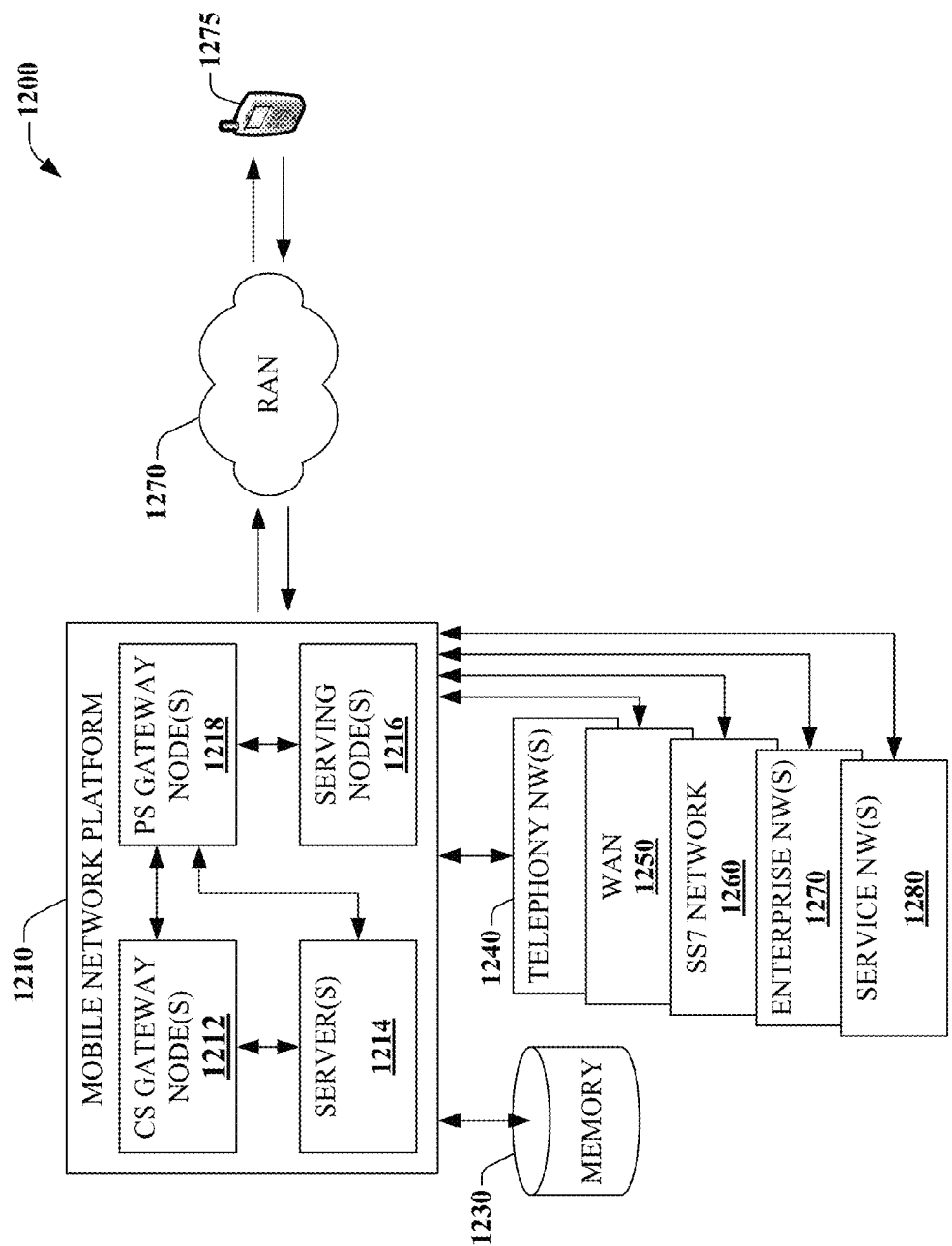
FIG. 12 depicts a block diagram of an example wireless communication network that can be operable for facilitating additional aspects.

FIG. 12 presents an example embodiment 1200 of a mobile network platform 1210 that can implement and exploit one or more aspects of the disclosed subject matter described herein. For instance, mobile network platform 1210 can be utilized by, or at least in part subsumed within, network 402 of FIG. 4. In another aspect, mobile network(s) 104 or 502 can include, in whole or in part, mobile network platform 1210. In yet other aspects, mobile network platform 1210 can control or provide network functionality for Wi-Fi AP 204, 608A, 608B or 608C, or for macro base station 206, 304, 604A, 604B or 604C, or a suitable combination thereof.

Mobile network platform 1210 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. Mobile network platform 1210 includes CS gateway node(s) 1212 which can interface CS traffic received from legacy networks like telephony network(s) 1240 (e.g., public switched telephone network (PSTN), or public land mobile network (PLMN)) or a signaling system #7 (SS7) network 1260. Circuit switched gateway node(s) 1212 can authorize and authenticate traffic (e.g., voice) arising from such networks. Additionally, CS gateway node(s) 1212 can access mobility, or roaming, data generated through SS7 network 1260; for instance, mobility data stored in a visited location register (VLR), which can reside in memory 1230. Moreover, CS gateway node(s) 1212 interfaces CS-based traffic and signaling and PS gateway node(s) 1218. As an example, in a 3GPP UMTS network, CS gateway node(s) 1212 can be realized at least in part in gateway GPRS support node(s) (GGSN). It should be appreciated that functionality and specific operation of CS gateway node(s) 1212, PS gateway node(s) 1218, and serving node(s) 1216, is provided and dictated by radio technology(ies) utilized by mobile network platform 1210 for telecommunication.

In the disclosed subject matter, in addition to receiving and processing CS-switched traffic and signaling, PS gateway node(s) 1218 can authorize and authenticate PS-based data sessions with served mobile devices. Data sessions can include traffic, or content(s), exchanged with networks external to the mobile network platform 1210, like wide area network(s) (WANs) 1250, enterprise network(s) 1270, and service network(s) 1280, which can be embodied in local area network(s) (LANs), can also be interfaced with mobile network platform 1210 through PS gateway node(s) 1218. It is to be noted that WANs 1250 and enterprise network(s) 1260 can embody, at least in part, a service network(s) like IP multimedia subsystem (IMS). Based on radio technology layer(s) available in technology resource(s) 1217, packet-switched gateway node(s) 1218 can generate packet data protocol contexts when a data session is established; other data structures that facilitate routing of packetized data also can be generated. To that end, in an aspect, PS gateway node(s) 1218 can include a tunnel interface (e.g., tunnel termination gateway (TTG) in 3GPP UMTS network(s) (not shown)) which can facilitate packetized communication with disparate wireless network(s), such as Wi-Fi networks. In at least one aspect, the networks external to the mobile network platform can comprise a network for generating, storing, acquiring or outputting traffic speed information for one or more geographic regions, which can include traffic server 512 of FIG. 5, supra.

In embodiment 1200, mobile network platform 1210 also includes serving node(s) 1216 that, based upon available radio technology layer(s) within technology resource(s) 1217, convey the various packetized flows of data streams received through PS gateway node(s) 1218. It is to be noted that for technology resource(s) 1217 that rely primarily on CS communication, server node(s) can deliver traffic without reliance on PS gateway node(s) 1218; for example, server node(s) can embody at least in part a mobile switching center. As an example, in a 3GPP UMTS network, serving node(s) 1216 can be embodied in serving GPRS support node(s) (SGSN).

For radio technologies that exploit packetized communication, server(s) 1214 in mobile network platform 1210 can execute numerous applications (e.g., location services, wireless device management, identifying nearby Wi-Fi access points, estimating position data for suitable mobile devices outside periodic location determinations, . . . ) that can generate multiple disparate packetized data streams or flows, and manage (e.g., schedule, queue, format, duplicate, direct, . . . ) such flows. Such application(s) can include add-on features to standard services (for example, provisioning, billing, customer support . . . ) provided by mobile network platform 1210. Data streams (e.g., content(s) that are part of a voice call or data session) can be conveyed to PS gateway node(s) 1218 for authorization/authentication and initiation of a data session, and to serving node(s) 1216 for communication thereafter. In addition to the application server, server(s) 1214 can include operator systems for acquiring network event or mobile position location information, such as real-time location server 508 or network event server 510 of FIG. 5, supra. Moreover, server(s) 1214 can include utility server(s), a utility server can include a provisioning server, an operations and maintenance server, a security server that can implement at least in part a certificate authority and firewalls as well as other security mechanisms, and the like. In an aspect, security server(s) secure communication served through mobile network platform 1210 to ensure network's operation and data integrity in addition to authorization and authentication procedures that CS gateway node(s) 1212 and PS gateway node(s) 1218 can enact. Moreover, provisioning server(s) can provision services from external network(s) like networks operated by a disparate service provider; for instance, WAN 1250 or Global Positioning System (GPS) network(s) (not shown). Provisioning server(s) can also provision coverage through networks associated to mobile network platform 1210 (e.g., deployed and operated by the same service provider), such as Femto cell network(s) or Wi-Fi network(s) (not shown) that enhance wireless service coverage within indoor or confined spaces and offload or share RAN resources in order to enhance subscriber service experience within a home or business environment.

It is to be noted that server(s) 1214 can include one or more processors configured to confer at least in part the functionality of macro network platform 1210. To that end, the one or more processors can execute code instructions stored in memory 1230, for example.

In example embodiment 1200, memory 1230 can store information related to operation of mobile network platform 1210. In particular, memory 1230 can include contents of topography database 210 in example estimation engine 200. Other operational information can include provisioning information of mobile devices served through wireless platform network 1210, subscriber databases; application intelligence, pricing schemes, e.g., promotional rates, flat-rate programs, subscription services which can include an IP session persistence service; technical specification(s) consistent with telecommunication protocols for operation of disparate radio, or wireless, technology layers; and so forth. Memory 1230 can also store information from at least one of telephony network(s) 1240, WAN 1250, SS7 network 1260, enterprise network(s) 1270 or service network(s) 1280.

It is to be noted that aspects, and features of the disclosed subject matter described in the subject specification can be exploited in substantially any wireless communication technology. For instance, Wi-Fi, WiMAX, Enhanced GPRS, 3GPP LTE, 3GPP2 UMB, 3GPP UMTS, HSPA, HSDPA, HSUPA, GERAN, UTRAN, LTE Advanced. Additionally, substantially all aspects of the disclosed subject matter as disclosed in the subject specification can be exploited in legacy telecommunication technologies; e.g., GSM. In addition, mobile as well non-mobile networks (e.g., internet, data service network such as internet protocol television (IPTV)) can exploit aspects or features described herein.

Various aspects or features described herein can be implemented as a method, apparatus or system, or article of manufacture using standard programming or engineering techniques. In addition, various aspects or features disclosed in the subject specification also can be effected through program modules that implement at least one or more of the methods disclosed herein, the program modules being stored in a memory and executed by at least a processor. Other combinations of hardware and software or hardware and firmware can enable or implement aspects described herein, including disclosed method(s). The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical discs (e.g., compact disc (CD), digital versatile disc (DVD), blu-ray disc (BD) . . . ), smart cards, and flash memory devices (e.g., card, stick, key drive . . . ).

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

What has been described above includes examples of systems and methods that provide aspects of the disclosed subject matter. It is, of course, not possible to describe every conceivable combination of components or methodologies for purposes of describing the disclosed subject matter, but one of ordinary skill in the art may recognize that many further combinations and permutations of the subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:
receiving, by a system including a processor, a first data input indicative of a first geographic location of a mobile device at a first instance in time;
receiving, by the system, a second data input indicative of a second geographic location of the mobile device at a second instance in time;
estimating, by the system, a speed of the mobile device based at least in part on the first geographic location, the first instance in time, the second geographic location and the second instance in time;
receiving, by the system, a network event pertaining to the mobile device at a third instance in time that occurs between the first instance in time and the second instance in time;
determining, by the system, a location of the mobile device at the third instance in time based at least on the speed of the mobile device, the first data input and the second data input; and
associating, by the system, the location of the mobile device with the network event.

2. The method of claim 1, further comprising utilizing, by the system, topographical information in a vicinity of the first geographic location or the second geographic location at least in part for determining the location of the mobile device at the third instance in time.

3. The method of claim 2, wherein the utilizing the topographical information comprises employing road network information about a road of a road network for determining the location of the mobile device at the third instance in time.

4. The method of claim 3, wherein the determining the location of the mobile device comprises employing speed limit data pertaining to the road of the road network.

5. The method of claim 4, wherein the speed of the mobile device is estimated at least in part with the speed limit data.

6. The method of claim 1, further comprising determining, by the system, whether the mobile device is moving at a motor vehicle rate based on the speed of the mobile device.

7. The method of claim 6, wherein, in response to determining the mobile device is not moving at the motor vehicle rate, the determining the location of the mobile device comprises utilizing pedestrian travel topography information to determine the location of the mobile device.

8. The method of claim 6, wherein, in response to determining the mobile device is moving at the motor vehicle rate, the determining the location of the mobile device comprises referencing road network topography information.

9. The method of claim 6, further comprising determining, by the system, a route of travel for the mobile device utilizing the speed of the mobile device, the first geographic location, the second geographic location and topography information pertaining to a mode of travel and a route of travel.

10. The method of claim 9, further comprising receiving, by the system, current traffic input data pertinent to the first time or the second time and, in response to determining the mobile device is moving at the motor vehicle rate, utilizing the current traffic input data in conjunction with the estimating the speed of the mobile device, and in determining the location of the mobile device.

11. A system, comprising:
at least one communication interface that sends and receives information pertaining to a wireless network with a set of components of the wireless network;
at least one memory that stores executable instructions; and
at least one processor, coupled to the at least one memory and the at least one communication interface, that facilitates execution of the executable instructions to perform operations, comprising:
receiving location data comprising location information pertaining to a mobile device for at least two points in time, wherein the location data is obtained via the at least one communication interface;
determining a speed of the mobile device;
receiving a notification of a network event pertaining to the mobile device and a time of the network event;
estimating a position of the mobile device at the time of the network event utilizing the location information and the speed of the mobile device, the at least two points in time, and the time of the network event; and
outputting the position of the mobile device to be associated with a geographic area of the network event, in response to receipt of the notification of the network event.

12. The system of claim 11, wherein the operations further comprise at least one of:
interpolating the estimated position of the mobile device in response to the time of the network event occurring between the at least two points in time; or
extrapolating the estimated position of the mobile device in response to the time of the network event occurring after a later one of the at least two points in time.

13. The system of claim 11, wherein the operations further comprise receiving topographical data in a vicinity of the location information for identifying routes of travel within the vicinity of the location information, and identifying a route of travel of the mobile device from the routes of travel and the speed of the mobile device.

14. The system of claim 13, wherein the topographical data comprises a topographical map of the vicinity of the location information, and the operations further comprise identifying the route of travel with respect to the topographical map.

15. The system of claim 14, wherein the operations further comprise at least one of:
employing an automotive route map as the topographical map in response to the speed of the mobile device satisfying a first function that models vehicular speed for the vicinity of the location information;

employing a cycling route map as the topographical map in response to the speed of the mobile device satisfying a second function that models a cycling speed; or employing a pedestrian map as the topographical map in response to the speed of the mobile device satisfying a third function that models a pedestrian speed.

16. The system of claim 11, wherein the operations further comprise:

acquiring traffic information for the vicinity of the location information that satisfies a first function that models a set of modes of travel associated with the mobile device; and modifying speed of the mobile device in response to concurrent traffic speeds derived from the traffic information deviating from a predetermined speed limit for the mode of travel at the vicinity of the location information.

17. The system of claim 11, wherein the operations further comprise:

acquiring mobile device-submitted location information pertaining to the network event; and refining the estimated position of the mobile device during the time of the network event as a function of the mobile device-submitted location information.

18. A non-transitory computer-readable medium comprising computer-readable instructions that, in response to execution facilitated by a processor, cause a system including the processor to perform operations, comprising:

employing a set of known geographic locations for a mobile device and associated respective times and a speed of the mobile device to determine another location of the mobile device at a time of occurrence of a network event associated with the mobile device, wherein the set of known geographic locations for the mobile device excludes the other location determined from the set of known geographic locations and associated respective times of the mobile device; and outputting the other location of the mobile device determined from the set of known geographic locations and associated respective times as an estimated position of the network event for the time of occurrence.

19. The non-transitory computer-readable medium of claim 18, wherein the operations further comprise:

determining a mode of travel for the mobile device at least in part from the speed of the mobile device;

identifying routes of travel within a pre-determined vicinity of the set of known geographic locations that satisfy a first pre-defined function with respect to the mode of travel; and fitting the known geographic locations to the routes of travel and determining a best fit route of travel for the mobile device.

20. The non-transitory computer-readable medium of claim 19, wherein the operations further comprise:

acquiring traffic speed information relevant to the best fit route of travel at the time coinciding with the network event; wherein employing the known geographic locations to extrapolate the additional position of the mobile device comprises:

determining a position of the mobile device along the best fit route of travel at the time coinciding with the network event; and updating the position of the mobile device along the best fit route of travel at least in part from the traffic speed information relevant to the best fit route of travel.

* * * * *